(12) United States Patent
Chen

(10) Patent No.: US 12,167,030 B2
(45) Date of Patent: Dec. 10, 2024

(54) ENCODING AND DECODING METHOD AND APPARATUS, AND DEVICES THEREFOR

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 0 days.

(21) Appl. No.: 17/766,217

(22) PCT Filed: Oct. 28, 2020

(86) PCT No.: PCT/CN2020/124311
§ 371 (c)(1),
(2) Date: Apr. 1, 2022

(87) PCT Pub. No.: WO2021/093589
PCT Pub. Date: May 20, 2021

(65) Prior Publication Data
US 2024/0073447 A1    Feb. 29, 2024

(30) Foreign Application Priority Data
Nov. 14, 2019    (CN) .......................... 201911115040.X

(51) Int. Cl.
*H04N 19/105*    (2014.01)
*H04N 19/176*    (2014.01)
(Continued)

(52) U.S. Cl.
CPC ......... *H04N 19/577* (2014.11); *H04N 19/105* (2014.11); *H04N 19/176* (2014.11); *H04N 19/186* (2014.11); *H04N 19/513* (2014.11)

(58) Field of Classification Search
None
See application file for complete search history.

(56) References Cited

U.S. PATENT DOCUMENTS

2010/0111188 A1    5/2010    Takahashi et al.
2019/0320199 A1*   10/2019   Chen ...................... H04N 19/00
(Continued)

FOREIGN PATENT DOCUMENTS

| CN | 1498391 A | 5/2004 |
| CN | 102387360 A | 3/2012 |

(Continued)

OTHER PUBLICATIONS

International Search Report for PCT/CN2020/124311 mailed on Jan. 29, 2021, and its English translation provided by WIPO.
(Continued)

*Primary Examiner* — Christopher G Findley
(74) *Attorney, Agent, or Firm* — Ladas & Parry, LLP

(57) ABSTRACT

The present disclosure provides encoding and decoding methods, apparatus and devices thereof. The method includes: if the conditions are all satisfied, determining to use a bidirectional prediction compensation mode for a current block; if determining to use the bidirectional prediction compensation mode for the current block, performing motion compensation for the current block.

17 Claims, 7 Drawing Sheets

(51) Int. Cl.
   *H04N 19/186*   (2014.01)
   *H04N 19/513*   (2014.01)
   *H04N 19/577*   (2014.01)

(56) References Cited

U.S. PATENT DOCUMENTS

| | | | |
|---|---|---|---|
| 2020/0154127 | A1 | 5/2020 | Lee |
| 2021/0058634 | A1* | 2/2021 | Li ........................... H04N 19/44 |
| 2022/0264086 | A1* | 8/2022 | Zhang .................. H04N 19/577 |

FOREIGN PATENT DOCUMENTS

| | | | |
|---|---|---|---|
| CN | 102934444 | A | 2/2013 |
| CN | 107710762 | A | 2/2018 |
| CN | 107925775 | A | 4/2018 |
| CN | 108028929 | A | 5/2018 |
| CN | 108141594 | A | 6/2018 |
| CN | 110225346 | A | 9/2019 |
| CN | 110312132 | A | 10/2019 |
| CN | 110324623 | A | 10/2019 |
| CN | 110402579 | A | 11/2019 |
| CN | 111031318 | A | 4/2020 |
| CN | 111031317 | A | 12/2020 |
| CN | 112118455 | A | 12/2020 |
| JP | 2022551937 | A | 12/2022 |
| KR | 20190024553 | A | 3/2019 |
| WO | 2018212578 | A1 | 11/2018 |
| WO | 2019045427 | A1 | 3/2019 |

OTHER PUBLICATIONS

Written Opinion for PCT/CN2020/124311 mailed on Jan. 29, 2021, and its English translation provided by Google Translate.
State Intellectual Property Office of the People's Republic of China, Office Action and Search Report Issued in Application No. 202010988727.0, May 31, 2021, 10 pages. (Submitted with Machine/Partial Translation).
State Intellectual Property Office of the People's Republic of China, Office Action issued in Application No. 202010988727.0, Oct. 28, 2021, 12 pages. (Submitted with Machine/Partial Translation).
State Intellectual Property Office of the People's Republic of China, Office Action and Search Report Issued in Application No. 202010988777.9, Jun. 2, 2021, 151 pages. (Submitted with Machine/Partial Translation).
State Intellectual Property Office of the People's Republic of China, Office Action Issued in Application No. 2020109887779, Sep. 2, 2021, 12 pages. (Submitted with Machine/Partial Translation).
Fangdong Chen et al. "Non-CE4: On Enabling Condition of BDOF and DMVR" Joint Video Experts Team (JVET) of ITU-T SG 16 WP 3 and ISO/IEC JTC 1/SC 29/WG 11 16th Meeting: Geneva, CH, JVET-P0311, Sep. 25, 2019 (Sep. 25, 2019),3pages.
Kyohei Unno et al."Non-CE4: An applying condition of BDOF" Joint Video Experts Team (JVET)of ITU-T SG 16 WP 3 and ISO/IEC JTC 1/SC 29/WG 11 16th Meeting: Geneva, CH, JVET-P0546, Sep. 27, 2019(Sep. 27, 2019),3 pages.
Na Zhang et al."Title: Non-CE4: Enabling BDOF and DMVR according to reference picture types" Joint Video Experts Team (JVET) of ITU-T SG 16 WP 3 and ISO/IEC JTC 1/SC 29/WG 1116th Meeting: Geneva, CH,JVET P0191, Sep. 25, 2019(Sep. 25, 2019),5pages.
Ruoyang Yu et al."Non-CE9: On motion refinement parameter derivation in BDOF" Joint Video Experts Team (JVET) of ITU-T SG 16 WP 3 and ISO/IEC JTC 1/SC 29/WG 11 14th Meeting: Geneva, CH, JVET-N0152, Mar. 12, 2019 (Mar. 12, 2019),5 pages.
Jianle Chen et al."Algorithm description for Versatile Video Coding and Test Model 7 (VTM 7)" Joint Video Experts Team (JVET) of ITU-T SG 16 WP 3 and ISO/IEC JTC 1/SC 29/WG 11 16th Meeting: Geneva, CH,JVET-P2002-v1, Nov. 11, 2019(Nov. 10, 2019),89 pages.
Hongbin Liu et al."Two-Pass Bi-Directional Optical Flow via Motion Vector Refinement" 2019 IEEE International Conference on Imagel Processing (ICIP), Aug. 26, 2019(Aug. 26, 2019),4 pages.
Jianle Chen et al."Algorithm description for Versatile Video Coding and Test Model 5 (VTM 5)" Joint Video Experts Team (JVET)of ITU-T SG 16 WP 3 and ISO/IEC JTC 1/SC 29/WG 1114th Meeting: Geneva, CH, JVET-N1002-v2 Jun. 11, 2019(Jun. 11, 2019),76 pages.
Yangminjie "Research on Intra and Inter Prediction Techniques in Video Coding" Sep. 15, 2018(Sep. 15, 2018) 85pages.
Japanese Patent Office Action from the corresponding Japanese Application No. 2022-520622, Jun. 5, 2023, (Submitted with Machine Translation).
Xiaoyu Xiu et al., "Non-CE4: Unified BDOF and DMVR early termination threshold", Joint Video Experts Team (JVET) of ITU-T SG 16 WP3 and ISO/IEC JTC 1/SC 29/WG 11,JVET-P0654_r1, 16th Meeting: Geneva, CH,Oct. 1-11, 2019.
Benjamin Bross et al., "Versatile Video Coding (Draft 7)", Joint Video Experts Team (JVET) of ITU-T SG 16 WP 3 and ISO/IEC JTC 1/SC 29/WG 11,JVET-P2001-vD, 16th Meeting: Geneva, CH,Oct. 1-11, 2019.

* cited by examiner

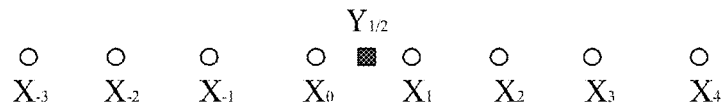

FIG.1A

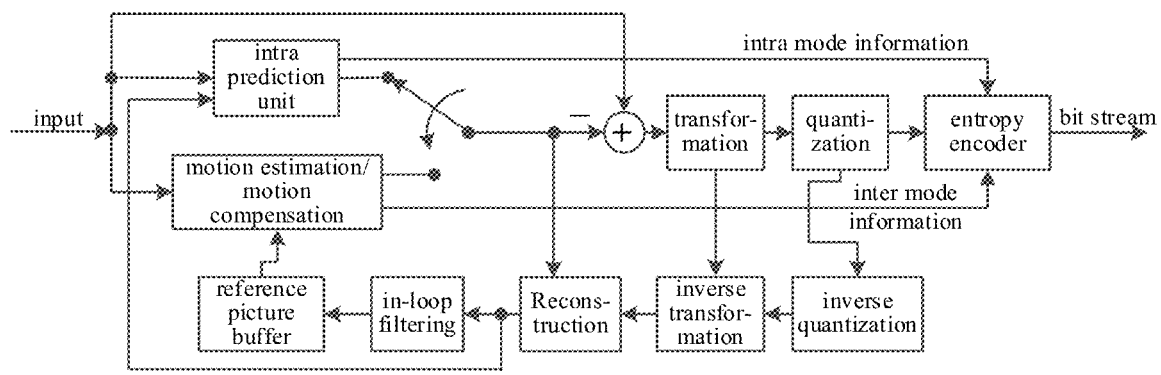

FIG.1B

```
determine to enable the bidirectional prediction compensation mode for the current
block, in response to determining that:
   control information allows a current block to enable a bidirectional prediction
compensation mode; the current block adopts a parallel movement motion model; a
prediction mode of the current block is not a sub-block mode, not an SMVD mode and not
a CIIP mode; prediction values of the current block are obtained by use of weighted
sample prediction process on reference blocks of two reference pictures, one reference
picture is displayed earlier than a current picture, the other reference picture is displayed
later than the current picture, and the two reference pictures have a same distance from the
current picture; the two reference pictures of the current block have a same weight; the
two reference pictures of the current block both are short-term reference pictures; a width,
a height and an area of the current block are all within defined ranges; the two reference
pictures of the current block are identical in size to the current picture; and the current
block only performs luma component prediction compensation
```
— 201

```
in response to determining to use the bidirectional prediction compensation mode for
the current block, perform motion compensation based on the bidirectional prediction
compensation mode for the current block
```
— 202

FIG.2 determine to use the bidirectional prediction compensation mode for the current block, in response to determining that:
control information allows a current block to enable a bidirectional prediction compensation mode; the current block adopts a parallel movement motion model; a prediction mode of the current block is not a sub-block mode, not an SMVD mode and not a CIIP mode; prediction values of the current block are obtained by use of weighted sample prediction process on reference blocks of two reference pictures, one reference picture is displayed earlier than a current picture, the other reference picture is displayed later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture — 501 in response to determining to use the bidirectional prediction compensation mode for the current block, perform motion compensation based on the bidirectional prediction compensation mode for the current block — 502

FIG. 5

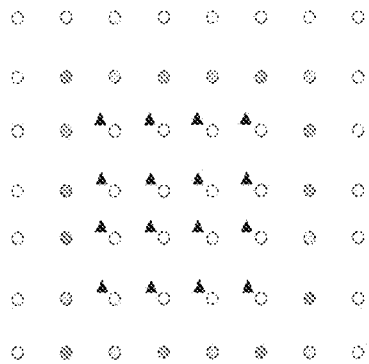

FIG. 6A

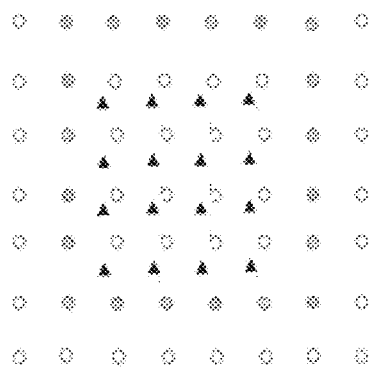

FIG. 6B

ENCODING AND DECODING METHOD AND APPARATUS, AND DEVICES THEREFOR

CROSS-REFERENCE TO RELATED APPLICATIONS

This application is the U.S. national phase of PCT Application No. PCT/CN2020/124311 filed on Oct. 28, 2020, which claims priority to the Chinese patent application No. 201911115040.X filed on Nov. 14, 2019, the disclosures of which are incorporated herein by reference in their entireties.

TECHNICAL FIELD

The present disclosure relates to the field of encoding and decoding technologies, and in particular to encoding and decoding methods and encoding and decoding apparatuses and devices thereof.

BACKGROUND

For saving spaces, video images are always transmitted after being encoded. A video encoding method may include processes such as prediction, transformation, quantization, entropy encoding, filtering, etc. The prediction encoding may include intra encoding and inter encoding. Further, the inter encoding refers to an operation of utilizing a temporal domain correlation of a video to predict pixel values of a current picture by using pixels of neighboring encoded pictures, so as to effectively remove temporal domain redundancy of the video. In inter coding, a motion vector (MV) can be used to represent a relative displacement between a current block of a current picture and a reference block of a reference picture. For example, a current video picture A and a reference video picture B have a relatively high temporal domain correlation. When an image block A1 (current block) of the video picture A needs to be transmitted, motion estimation is performed in the video picture B to obtain an image block B1 (i.e., reference block) which best matches the image block A1, and determine a relative displacement between the image block A1 and the image block B1, where the relative displacement is a motion vector of the image block A1.

In a conventional manner, when the current block is a unidirectional block, after unidirectional motion information of the current block is obtained, encoding/decoding is performed based on the unidirectional motion information, thus improving coding performance. But, when the current block is a bidirectional block, after bidirectional motion information of the current block is obtained, prediction images from two different directions may be obtained based on the bidirectional motion information, and the prediction images from two different directions usually have a mirror symmetry relationship. In the current encoding framework, this characteristic is not fully used to further remove redundancy, that is, in practice, for bidirectional blocks, problems such as poor coding performance and the like exist at present.

SUMMARY

The present disclosure provides an encoding and decoding method, an encoding and decoding apparatus and devices thereof, so as to improve encoding performance.

The present disclosure provides an encoding and decoding method. The method includes:

in response to determining that control information allows a current block to enable a bidirectional prediction compensation mode; the current block adopts a parallel movement motion model; a prediction mode of the current block is not a sub-block mode, not a symmetric motion vector difference (SMVD) mode and not a combine inter intra prediction (CIIP) mode; prediction values of the current block are obtained by use of a weighted sample prediction process on reference blocks of two reference pictures, and the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation; determining to use the bidirectional prediction compensation mode (such as bi-directional optical flow inter prediction mode) for the current block;

in response to determining to use the bidirectional prediction compensation mode for the current block, performing motion compensation based on the bidirectional prediction compensation mode for the current block.

The present disclosure provides an encoding and decoding method. The method includes:

in response to determining that control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, and the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; determining to use a bidirectional prediction compensation mode for a current block;

in response to determining to use the bidirectional prediction compensation mode for the current block, performing motion compensation based on the bidirectional prediction compensation mode for the current block.

The present disclosure provides an encoding and decoding apparatus. The apparatus includes:

a determining module, configured to determine to use a bidirectional prediction compensation mode for a current block in response to determining that:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation;

a motion compensation module, configured to: in response to determining to use the bidirectional prediction compensation mode for the current block, perform motion compensation based on the bidirectional prediction compensation mode for the current block.

The present disclosure provides a decoder device, comprising a processor, and a machine-readable storage medium, where the machine-readable storage medium stores machine executable instructions executed by the processor;

the processor is configured to execute the machine executable instructions to perform the steps of:

in response to determining that:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation; determining to use the bidirectional prediction compensation mode for the current block;

in response to determining to use the bidirectional prediction compensation mode for the current block, performing motion compensation based on the bidirectional prediction compensation mode for the current block.

The present disclosure provides an encoder device, including a processor, and a machine-readable storage medium, where the machine-readable storage medium stores machine executable instructions executed by the processor;

the processor is configured to execute the machine executable instructions to perform the steps of:

in response to determining that:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation; determining to use the bidirectional prediction compensation mode for the current block;

in response to determining to use the bidirectional prediction compensation mode for the current block, performing motion compensation based on the bidirectional prediction compensation mode for the current block.

The present disclosure provides a camera, including a processor and a machine-readable storage medium, where the machine-readable storage medium stores machine executable instructions executed by the processor;

the processor is configured to execute the machine executable instructions to perform the steps of:

in response to determining that:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed respectively earlier than and later than the current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation; determining to use the bidirectional prediction compensation mode for the current block in response to determining to use the bidirectional prediction compensation mode for the current block, performing motion compensation based on the bidirectional prediction compensation mode for the current block.

It can be seen from the above technical solutions that in the embodiments of the present disclosure, if it is determined to use a bidirectional prediction compensation mode for the current block, motion compensation based on the bidirectional prediction compensation mode can be performed for the current block, so as to solve low prediction quality, incorrect prediction and the like, and improve hardware implementation friendliness, increase the coding performance and improve coding performance and coding efficiency.

BRIEF DESCRIPTION OF THE DRAWINGS

In order to describe the technical solutions of the embodiments of the present disclosure more clearly, the accompanying drawings required for descriptions of the embodiments of the present disclosure are introduced briefly below. Apparently, the drawings described below are only some embodiments of the present disclosure. Those skilled in the art may also obtain other drawings based on these drawings of the embodiments of the present disclosure.

FIG. 1A is a schematic diagram illustrating interpolation according to an embodiment of the present disclosure.

FIG. 1B is a schematic diagram illustrating a framework of a video encoding system according to an embodiment of the present disclosure.

FIG. 2 is a flowchart illustrating an encoding and decoding method according to an embodiment of the present disclosure.

FIG. 5 is a flowchart illustrating an encoding and decoding method according to another embodiment of the present disclosure.

FIGS. 6A to 6E are schematic diagrams of filling a reference block according to an embodiment of the present disclosure.

DETAILED DESCRIPTION OF THE EMBODIMENTS

Figure 3:
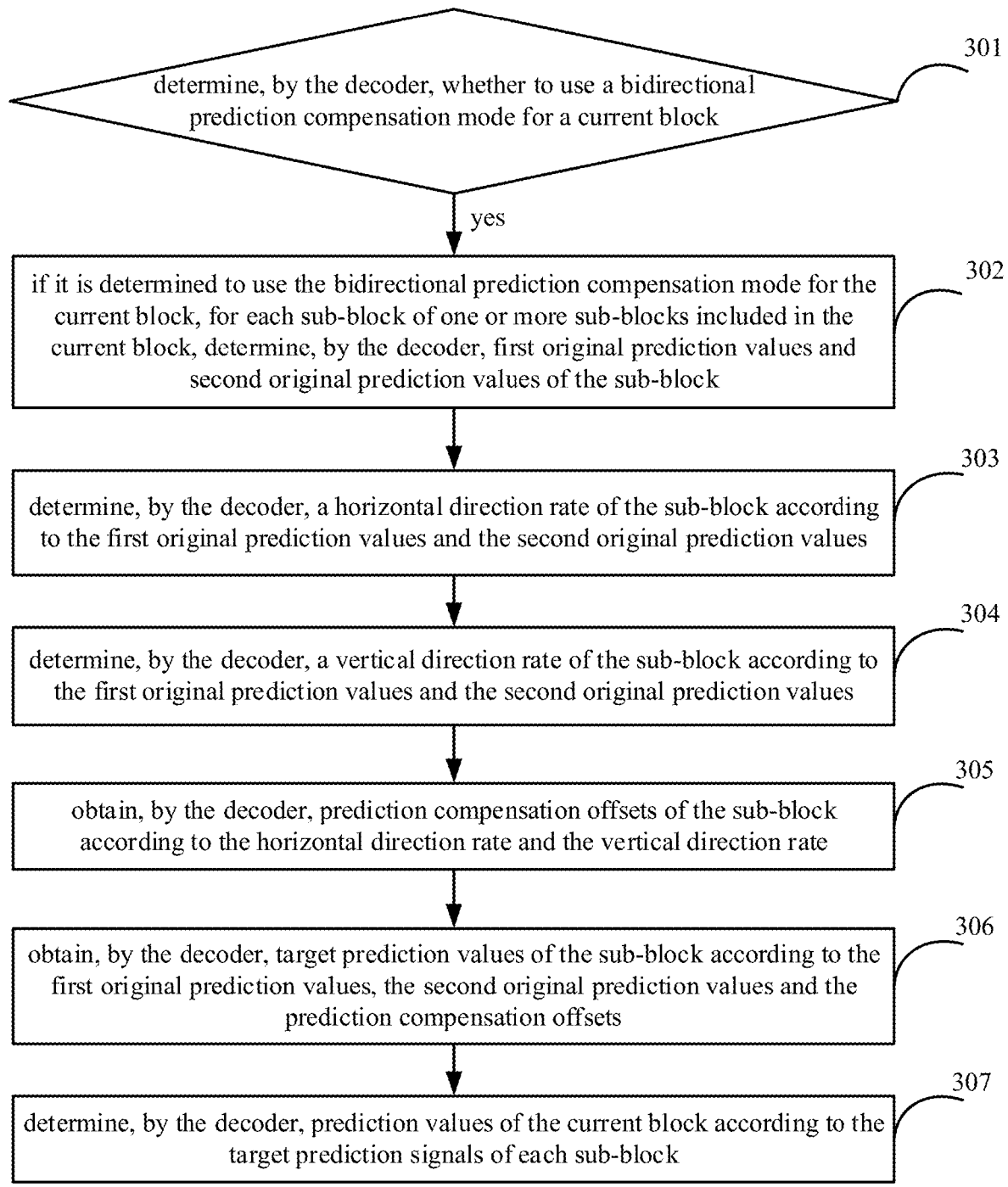
FIG. 3 is a flowchart illustrating an encoding and decoding method according to another embodiment of the present disclosure.

The terms used in the embodiments of the present disclosure are only for describing specific embodiments, rather than limiting the embodiments of the present disclosure. The singular forms of "a", "said" and "the" used in the present disclosure and claims are also intended to include plural forms, unless the context clearly indicates otherwise. It should also be understood that the term "and/or" as used herein refers to any one or all possible combinations of one or more associated listed items. It should be understood that although the terms such as first, second, third, etc. may be used in the embodiments of the present disclosure to describe various information, the information should not be limited by these terms. These terms are only used to distinguish the same type of information from each other. For example, without departing from the scope of the present disclosure, first information can also be referred to as second information, and similarly, second information can also be referred to as first information, thus, the selection of the terms depends on the context. In addition, the word "if" used can be interpreted as "upon" or "when" or "in response to determining".

One or more embodiments of the present disclosure provide an encoding and decoding method, apparatus and devices thereof, which may involve the following concepts.

Intra prediction and inter prediction technologies: intra prediction refers to an operation of utilizing a spatial domain correlation of a video to predict a value of a current pixel by using pixel values of one or more encoded blocks of a current picture, so as to remove spatial domain redundancies of the video; and inter prediction refers to an operation of utilizing a temporal domain correlation of a video to predict pixel values of a current picture by using pixel values of one or more neighboring encoded pictures because sequences in the video generally have a relatively strong temporal domain correlation, so as to effectively remove temporal domain redundancy of the video. Inter prediction parts in main video encoding standards adopt a block-based motion compensation technology of which the main principle is to find a best matching block in one or more previously encoded pictures for each pixel block of the current picture, where this process is referred to as Motion Estimation.

Motion Vector (MV): in inter encoding, a motion vector may be used to represent a relative displacement between a current block and a best matching block in a reference picture. Each block acquired by partition has a corresponding motion vector to be transmitted to a decoder. If the motion vector of each block is encoded and transmitted independently, especially when smaller-sized blocks are acquired by partition, more bits have to be consumed. For reducing the number of bits used to encode the motion vector, a spatial correlation between neighboring image blocks may be utilized to predict the motion vector of a current block based on the motion vectors of neighboring encoded blocks, and then, a prediction difference is encoded. In such a way, the number of bits representing the motion vector can be effectively reduced. In the process of encoding the motion vector of the current block, firstly, the motion vector of the current block is predicted by motion vectors of one or more neighboring encoded blocks, and then, a motion vector difference (MVD) between a motion vector prediction (MVP) value and a real estimation value of the motion vector is encoded, thereby effectively reducing the number of encoded bits.

Motion Information: because the motion vector represents a position offset of a current block relative to a reference block, for accurately acquiring the information oriented to an image block, in addition to the motion vector, index information of one or more reference pictures is also needed to indicate which reference picture is used. For a current picture, one reference picture list (may also be referred to as a reference picture sample array) may be established, and the index information of the reference pictures specifies which reference picture listed in the reference picture list is used by a current block. In addition, many encoding technologies also support multiple reference picture lists, thus, an index value may be used to indicate which reference picture list is used, and this index value can be referred to as a reference direction. The information related to motion, such as motion vector, reference picture index, reference direction, and the like, may be collectively referred to as motion information.

Interpolation: if a current motion vector is a non-integral pixel accuracy, existing pixel values cannot be copied directly from the reference picture corresponding to the current block and the pixel values required by the current block can be obtained by interpolation. As shown in FIG. 1A, if a pixel value $Y_{1/2}$ with an offset being ½ pixel needs to be obtained, the pixel value may be obtained by performing interpolation between surrounding existing pixel values X. In some examples, if an interpolated filter with a number of taps being N is adopted, the pixel value $Y_{1/2}$ may be obtained by performing interpolation for surrounding N integral pixels.

For example, if the number of taps is 8, $Y_{1/2}=\Sigma_{k=-3}^{4} a^k X_k$, where $a^k$ represents a filter coefficient, which is a weighted coefficient.

Motion compensation: the motion compensation is a process of obtaining all pixel values of the current block by interpolation or copying.

Merge mode: includes a regular merge mode (may also be referred to as a normal merge mode), a sub-block merge mode, (i.e., a merge mode using sub-block motion information, which may be called sub-block merge mode), a MMVD mode (i.e., a merge mode encoding motion differences, which may be called Merge with MVD mode), a CIIP mode (i.e., a merge mode of combining intra prediction with inter prediction to generate new prediction values, which can be called combine inter intra prediction mode), a TPM mode (i.e., a merge mode for triangular prediction, which may be called geometric partitioning merge mode with triangular partition), and a GEO mode (i.e., a merge mode based on arbitrary geometrical partitioning shape, which may be called Geometrical Partitioning).

Skip mode: a skip mode is a special merge mode, and the skip mode differs from the merge mode in that the skip mode does not need to encode a residual. If a current block is in the skip mode, the CIIP mode is disabled by default, but the regular merge mode, the sub-block merge mode, the MMVD mode, the TPM mode and the GEO mode are still applicable.

As an example, how to generate prediction values may be determined based on the regular merge mode, the sub-block merge mode, the MMVD mode, the TPM mode and the GEO mode, etc. After the prediction values are generated, for the merge mode, reconstruction values may be acquired by using the prediction values and residual values; and for the skip mode, because no residual value exists, a reconstruction value may be acquired by directly using the prediction value.

Sequence parameter set (SPS): in a sequence parameter set, there are flags that determine whether certain tools are allowed to be enabled and disabled in a whole sequence. If a value of flag is 1, a tool corresponding to the flag is allowed to be enabled in a video sequence; and if a value of the flag is 0, in a video sequence, a tool corresponding to the flag is not allowed to be enabled in the encoding process.

Regular merge mode: motion information is selected from a candidate motion information list, and then prediction values of a current block are generated based on the motion information, where the candidate motion information list includes: candidate motion information of one or more spatial neighboring blocks, candidate motion information of one or more temporal neighboring blocks, candidate motion information of one or more spatial non-neighboring blocks, motion information acquired by combining existing motion information, default motion information, etc.

MMVD mode: based on the candidate motion information list of the regular merge mode, motion information is selected from the candidate motion information list of the regular merge mode as reference motion information, a motion information difference is acquired by a method of table look-up, final motion information is acquired based on the reference motion information and the motion information difference, and prediction values of a current block are generated based on the final motion information.

CIIP mode: a new prediction value of the current block is acquired by combining an intra prediction value with an inter prediction value.

Sub-block merge mode: the sub-block merge mode includes an Affine merge mode and a subblock-based TMVP (temporal motion vector prediction) mode.

The Affine merge mode, similar to the regular merge mode, is also implemented by selecting motion information from a candidate motion information list, and generating prediction values of a current block based on the motion information. The Affine merge mode differs from the regular merge mode in that motion information in the candidate motion information list of the regular merge mode is a parallel movement motion vector with 2 parameters, but the motion information in the candidate motion information list of the Affine merge mode is Affine motion information with 4 parameters, or Affine motion information with 6 parameters.

The sub-block-based temporal motion vector prediction (TMVP) mode: in a temporal reference picture, motion information of a reference block is directly used to generate the prediction values of the current block, where the motion information of the sub-blocks in the block may be different.

TPM mode: one block is partitioned into two triangular sub-blocks (a 45-degree triangular sub-block and a 135-degree triangular sub-block), where the two triangular sub-blocks have different unidirectional motion information, the TPM mode is used in the prediction process and will not affect subsequent transformation and quantization processes, and the unidirectional motion information is also directly acquired from the candidate motion information list.

GEO mode: the GEO mode and the TPM mode are similar to each other, and different in partitioning shape. In the GEO mode, a square block is partitioned into two subblocks in any shapes (any other shapes besides the shapes of the two triangular subblocks of TPM), such as a triangular sub-block and a pentagonal subblock; or a triangular sub-block and a quadrilateral subblock; or two trapezoidal subblocks, and so on, and there is no restriction on the partitioning shape. The two subblocks partitioned in the GEO mode have different unidirectional motion information.

From the above examples, it can be seen that the merge modes and skip mode provided in the embodiments refer to one type of prediction modes implemented by directly selecting motion information from a candidate motion information list to generate prediction values of a current block. In these prediction modes, a motion vector refinement process is not required at an encoder, and except the MMVD mode, a motion information difference does not need to be encoded in the other modes.

Symmetric Motion Vector Difference (SMVD) mode: in the SMVD mode, two MVDs in bidirectional motion information are symmetric, that is, only one of two MVDs needs to be encoded and the other of the two MVDs is a negative of the one of two MVDs. The SMVD mode refers to that a motion vector difference of a particular direction of the bidirectional prediction mode is directly acquired, without encoding, by deriving based on the motion vector difference of another direction of the bidirectional prediction mode. As an example, a simple derivation method may be that scaling is directly performed on the motion vector difference of a particular direction to obtain a motion vector difference of the particular direction, where a scaling factor is related to a distance of the two reference pictures to the current picture.

Parallel movement motion model: the motion models may include but not limited to: a motion model with 2 parameters, (e.g., motion vector with 2 parameters), a motion model with 4 parameters (e.g., affine model with 4 parameters), a motion model with 6 parameters (e.g., affine model with 6 parameters), a motion model with 8 parameters (e.g., a projection model) etc. The parallel movement motion model refers to a motion model with 2 parameters, parallel movement refers to that, in a same plane, all points in a picture are moved a same distance along a straight-line direction, and this picture motion is called parallel movement motion of picture, abbreviated as parallel movement.

Video encoding framework: as shown in FIG. 1B, a video encoding framework can be used to implement a processing at an encoder according to an embodiment of the present disclosure. In addition, the schematic diagram of a video decoding framework is similar to FIG. 1B, and thus will not be repeated here. The video decoding framework can be used to implement the processing at a decoder according to an embodiment of the present disclosure. In some examples, in the video encoding framework and the video decoding framework, an intra prediction module, a motion estimation/motion compensation module, a reference picture buffer, an in-loop filtering module, a reconstruction module, a transform module, a quantization module, an inverse transform module, an inverse quantization module, an entropy encoder, etc. may be included. At the encoder, the processing of encoding can be implemented through the cooperation of the modules, and at the decoder, the processing of decoding can be implemented through the cooperation of the modules.

In the related arts, when the current block is a bidirectional block (e.g., the current block is a block adopting bidirectional prediction), prediction pictures from two different directions usually have a mirror symmetry relationship. In the current encoding framework, the characteristic is not used sufficiently to further remove redundancy, and problems such as poor coding performance and the like exist at present. For the above findings, in the embodiments of the present disclosure, when the current block is a bidirectional block, if it is determined to use a bidirectional prediction compensation mode (i.e. bi-directional optical flow inter prediction mode) for the current block, motion compensation based on the bidirectional prediction compensation mode can be performed for the current block, so as to solve low prediction quality, incorrect prediction and the like, and improve hardware implementation friendliness, increase the encoding performance and improve coding performance and coding efficiency. In some examples, the current block is a block adopting bidirectional prediction, which means that: the motion information of the current block is bidirectional motion information, the bidirectional motion information includes motion information of two different directions, and the motion information of the two different directions is referred to as first unidirectional motion information and second unidirectional motion information. The first unidirectional motion information may correspond to a first reference picture which is displayed earlier than a current picture where the current block is; the second unidirectional motion information may correspond to a second reference picture which is displayed later than the current picture where the current block is.

The encoding and decoding method of the embodiments of the present disclosure will be elaborated in combination with several specific embodiments.

Embodiment 1: FIG. 2 is a schematic diagram illustrating an encoding and decoding method according to an embodiment of the present disclosure. The encoding and decoding method may be applied to a decoder or an encoder. The encoding and decoding method may include the following steps.

At step 201, if the following conditions are all satisfied, it is determined to enable a bidirectional prediction compensation mode for a current block:

control information allows the current block to enable the bidirectional prediction compensation mode;
the current block adopts a parallel movement motion model;
a prediction mode of the current block is not a sub-block mode, not an SMVD mode and not a CIIP mode;
prediction values of the current block are obtained by use of a weighted sample prediction process on reference blocks of two reference pictures, and the two reference pictures are displayed respectively earlier than and later than a current picture, and the two reference pictures have a same distance from the current picture;
the two reference pictures of the current block have a same weight;
the two reference pictures of the current block both are short-term reference pictures;
a width, a height and an area of the current block are all within defined ranges;
the two reference pictures of the current block are identical in size to the current picture;
the current block performs luma (luminance) component prediction compensation.

In a possible implementation, if one of the following conditions is not satisfied, it is determined not to use the bidirectional prediction compensation mode for the current block: control information allows the current block to enable the bidirectional prediction compensation mode;
the current block adopts a parallel movement motion model;
a prediction mode of the current block is not a sub-block mode, not an SMVD mode and not a CIIP mode;
prediction values of the current block are obtained by use of a weighted sample prediction process on reference blocks of two reference pictures, and the two reference pictures are displayed respectively earlier than and later than a current picture, and the two reference pictures have a same distance from the current picture;
the two reference pictures of the current block have a same weight;
the two reference pictures of the current block both are short-term reference pictures;
a width, a height and an area of the current block are all within defined ranges;
the two reference pictures of the current block are identical in size to the current picture;
the current block only performs luma component prediction compensation.

In the above embodiment, nine conditions are given, and based on whether the nine conditions are all satisfied at the same time, whether to use the bidirectional prediction compensation mode for the current block is determined.

In practice, some conditions may be selected from the nine conditions, and then whether to use the bidirectional prediction compensation mode for the current block is determined based on the selected some conditions. For example, five conditions are selected from the nine conditions, which is not limited herein, and thus may also be any five conditions. If the selected five conditions are all satisfied, it is determined to use the bidirectional prediction compensation mode for the current block; if any one of the selected five conditions is not satisfied, it is determined not to use the bidirectional prediction compensation mode for the current block. Of course, another number of conditions may be selected from the nine conditions, which is not limited herein.

In the above embodiment, obtaining the prediction values of the current block by use of the weighted sample prediction process on the reference blocks of two reference pictures means that the current block adopts the bidirectional prediction mode, i.e., the prediction values of the current block are obtained by use of the weighted sample prediction process on reference blocks (i.e., prediction blocks) of two reference pictures. The current block corresponds to two motion information lists, which is denoted as first motion information (i.e., first unidirectional motion information), and second motion information (i.e., second unidirectional motion information), the first motion information includes a first reference picture and a first original motion vector, and the second motion information includes a second reference picture and a second original motion vector. The above two reference pictures may be the first reference picture and the second reference picture. The two reference pictures are displayed respectively earlier and later than a current picture, which refers to that: the first reference picture is displayed earlier than the current picture where the current block is, and the second reference picture is displayed later than the current picture. The first reference picture is referred to as forward reference picture which is in a first list (e.g., list0), the second reference picture is referred to as backward reference picture which is in a second list (e.g., list 1).

In the above embodiment, the width, the height and the area of the current block are all within the defined ranges, which includes but not limited to that: the width is greater than or equal to a first threshold, the height is greater than or equal to a second threshold, and the area is greater than or equal to a third threshold; or, the width is greater than or equal to the first threshold, the height is greater than or equal to the second threshold, and the area is greater than or equal to a fourth threshold. In some examples, the third threshold may be greater than the fourth threshold. For example, the first threshold may be 8, the second threshold may be 8, the third threshold may be 128, and the fourth threshold may be 64. Of course, the above values are merely several examples and will not be limited herein.

In the above embodiment, control information allows the current block to enable the bidirectional prediction compensation mode, including but not limited to that: sequence-level control information (e.g., control information of several pictures) allows the current block to enable the bidirectional prediction compensation mode; and/or, picture-level control information (control information of one picture) allows the current block to enable the bidirectional prediction compensation mode.

At step 202, if it is determined to use the bidirectional prediction compensation mode for the current block, motion compensation based on the bidirectional prediction compensation mode is performed for the current block.

In a possible implementation, the current block has one or more sub-blocks, if it is determined to use the bidirectional prediction compensation mode for the current block, for each of one or more sub-blocks of the current block: first original prediction values and second original prediction values of the sub-block are determined, and a horizontal direction rate and a vertical direction rate of the sub-block are determined based on the first original prediction values and the second original prediction values. According to the horizontal direction rate and the vertical direction rate, prediction compensation offsets of the sub-block are obtained, and according to the first original prediction values, the second original prediction values and the prediction compensation offsets, target prediction values of the sub-block are obtained. The prediction values of the current block are determined according to the target prediction values of each sub-block of the current block.

In some examples, determining the first original prediction values and the second original prediction values of the sub-block includes but not limited to: determining a sub-block unit corresponding to the sub-block, where the current block includes the sub-block unit and the sub-block unit includes the sub-block. A first reference block is determined from a first reference picture according to first unidirectional motion information of the sub-block unit, and a second reference block is obtained by extending the first reference block; a first target reference block corresponding to the sub-block is selected from the second reference block, and the first original prediction values of the sub-block are determined according to pixel values of the first target reference block. A third reference block is determined from a second reference picture according to second unidirectional motion information of the sub-block unit, and a fourth reference block is obtained by extending the third reference block; a second target reference block corresponding to the sub-block is selected from the fourth reference block, and the second original prediction values of the sub-block are determined according to pixel values of the second target reference block.

In some examples, obtaining the second reference block by extending the first reference block includes: respectively filling N rows of integral pixel on an upper edge and a lower edge of the first reference block, and respectively filling N columns of integral pixel on a left edge and a right edge of the first reference block, so as to obtain the second reference block, where N is 0 or a positive integer. Pixel values of the N rows of integral pixel filled in the second reference block and pixel values of the N columns of integral pixel filled in the second reference block are obtained by copying pixel values of neighboring integral pixel positions in the first reference picture, or pixel values of the N rows of integral pixel filled in the second reference block and pixel values of the N columns of integral pixel filled in the second reference block are obtained by copying pixel values of neighboring pixel in the first reference block.

In some examples, obtaining the fourth reference block by extending the third reference block includes: respectively filling N rows of integral pixel on an upper edge and a lower edge of the third reference block, and respectively filling N columns of integral pixel on a left edge and a right edge of the third reference block, so as to obtain the fourth reference block, where N is 0 or a positive integer. Pixel values of the N rows of integral pixel filled in the fourth reference block and pixel values of the N columns of integral pixel filled in the fourth reference block are obtained by copying pixel values of neighboring integral pixel positions in the second reference picture, or pixel values of the N rows of integral pixel filled in the fourth reference block and pixel values of the N columns of integral pixel filled in the fourth reference block are obtained by copying pixel values of neighboring pixel in the third reference block.

In a possible implementation, determining the horizontal direction rate of the sub-block according to the first original prediction values and the second original prediction values may include: determining a coefficient S1 and a coefficient S3 according to the first original prediction values and the second original prediction values; determining the horizontal direction rate of the sub-block according to the coefficient S1, the coefficient S3 and a rate threshold.

Determining the vertical direction rate of the sub-block according to the first original prediction values and the second original prediction values may include: determining a coefficient S2, a coefficient S5 and a coefficient S6 according to the first original prediction values and the second original prediction values; determining the vertical direction rate of the sub-block according to the coefficient S2, the coefficient S5, the coefficient S6, the rate threshold and the horizontal direction rate of the sub-block.

In some examples, the determination manner and relevant definitions of the coefficient S1, the coefficient S3, the coefficient S2, the coefficient S5, and the coefficient S6 may be referred to subsequent embodiments and will not be described herein.

In some examples, the horizontal direction rate of the sub-block refers to a horizontal direction (i.e., X direction) rate of a reference block which corresponds to the sub-block and is in the reference picture.

In some examples, the vertical direction rate of the sub-block refers to a vertical direction (i.e., Y direction) rate of a reference block corresponding to the sub-block on the reference picture.

In a possible implementation, according to the horizontal direction rate and the vertical direction rate, obtaining the prediction compensation offsets of the sub-block may include but not limited to: determining a first horizontal direction gradient and a first vertical direction gradient based on the first original prediction values; determining a second horizontal direction gradient and a second vertical direction gradient based on the second original prediction values. Then, according to the horizontal direction rate, the first horizontal direction gradient, the second horizontal direction gradient, the vertical direction rate, the first vertical direction gradient, and the second vertical direction gradient, the prediction compensation offsets of the sub-block are obtained.

In some examples, for each pixel position of the sub-block, the first horizontal direction gradient is a horizontal direction gradient corresponding to the pixel position in the first reference picture, the first vertical direction gradient is a vertical direction gradient corresponding to the pixel position in the first reference picture, the second horizontal direction gradient is a horizontal direction gradient corresponding to the pixel position in the second reference picture, and the second vertical direction gradient is a vertical direction gradient corresponding to the pixel position in the second reference picture. The horizontal direction rate is a rate of the sub-block in the horizontal direction (i.e., each pixel position in the sub-block corresponds to a same horizontal direction rate), and the vertical direction rate is a rate of the sub-block in the vertical direction (i.e., each pixel position in the sub-block corresponds to a same vertical direction rate).

In a word, for each pixel position of the sub-block, according to the first horizontal direction gradient, the second horizontal direction gradient, the horizontal direction rate, the vertical direction rate, the first vertical direction gradient and the second vertical direction gradient corresponding to the pixel position, a prediction compensation offset of the pixel position may be determined. Then, according to the first original prediction values, the second original prediction value and the prediction compensation offset corresponding to the pixel position, a target prediction value of the pixel position may be obtained.

In some examples, for each sub-block, after the target prediction value of each pixel position of the sub-block is obtained, the target prediction values of these pixel positions may be combined to obtain the target prediction values of the sub-block. For the current block, after the target prediction values of each sub-block of the current block are obtained, the target prediction values of these sub-blocks may be combined to obtain the prediction values of the current block.

From the above technical solutions, it can be seen that, in the embodiments of the present disclosure, if it is determined to use a bidirectional prediction compensation mode for the current block, motion compensation based on the bidirectional prediction compensation mode can be performed for the current block, so as to solve low prediction quality, incorrect prediction and the like, and improve hardware implementation friendliness, increase the encoding performance and improve encoding performance and encoding efficiency.

Embodiment 2: based on the same idea as the above method, as shown in FIG. 3, a flow chart illustrating another encoding and decoding method according to an embodiment of the present disclosure is provided. The method may be applied to a decoder. The method may include the following steps.

At step 301, the decoder determines whether to use a bidirectional prediction compensation mode for a current block; if yes, step 302 is performed; if not, the bidirectional prediction compensation mode provided in the present disclosure is not adopted, which is not limited for this specific processing.

In some examples, if the decoder determines to use the bidirectional prediction compensation mode for the current block, it indicates that the prediction values obtained based on the motion information is not accurate. Therefore, the bidirectional prediction compensation mode (the technical solution of the present disclosure) is used for the current block, and step 302 is performed. If the decoder determines not to use the bidirectional prediction compensation mode for the current block, it indicates that the prediction values obtained based on the motion information is sufficiently accurate, and thus the bidirectional prediction compensation mode is not used for the current block.

In some examples, the decoder may receive a bit stream, and determine whether to use the bidirectional prediction compensation mode for the current block based on decoded information in the bit stream (based on the decoded information, it is known whether relevant conditions of Embodiment 1 are satisfied).

At step 302, if it is determined to use the bidirectional prediction compensation mode for the current block, for each sub-block of one or more sub-blocks included in the current block, the decoder determines first original prediction values and second original prediction values of the sub-block.

In some examples, the current block may be partitioned into one or more sub-block units, for example, the current block may include one sub-block unit (the sub-block unit is the current block), or the current block may include at least two sub-block units. For example, a width of the sub-block unit is dx, a height of the sub-block unit is dy, a width of the current block is W and a height of the current block is H. If W is greater than a, dx is a, and if W is not greater than a, dx is W. If H is greater than a, dy is a, and if H is not greater than a, dy is H. The value of a may be configured according to experiences, for example, 4, 8, 16, and 32 and the like. For ease of descriptions, a=16 is taken as an example subsequently to describe. For example, if the size of the current block is 8*16, the current block only includes one sub-block unit, and the size of the sub-block unit is 8*16. For another example, if the size of the current block is 8*32, the current block includes a sub-block unit 1 and a sub-block unit 2, and the sizes of the sub-block unit 1 and the sub-block unit 2 are both 8*16. For another example, if the size of the current block is 16*32, the current block includes a sub-block unit 1 and a sub-block unit 2, and the sizes of the sub-block unit 1 and the sub-block unit 2 are both 16*16. Of course, the above are merely several examples, which is not limited herein. For ease of descriptions, descriptions will be made below with the current block including a sub-block unit 1 and a sub-block unit 2, each of which has a size of 16*16, as an example.

For each sub-block unit, each sub-block unit may be partitioned into one or more sub-blocks, for example, when the size of the sub-block is 4*4, the sub-block unit 1 may be partitioned into 16 sub-blocks, and the sub-block unit 2 may be partitioned into 16 sub-blocks. For another example, when the size of the sub-block is 8*8, the sub-block unit 1 may be partitioned into 4 sub-blocks, and the sub-block unit 2 may be partitioned into 4 sub-blocks. For another example, when the size of the sub-block is 16*16, the sub-block unit 1 may be partitioned into 1 sub-block, and the sub-block unit 2 may be partitioned into 1 sub-block. Of course, the above is merely several examples, which is not limited herein. For ease of descriptions, descriptions will be made below with an example in which the sub-block unit 1 is partitioned into 16 sub-blocks and the sub-block unit 2 is partitioned into 16 sub-blocks.

For each sub-block unit (for example, sub-block unit 1), the first reference block may be determined from the first reference picture according to the first unidirectional motion information of the sub-block unit 1, the size of the sub-block unit 1 is 16*16, and the size of the first reference block is 16*16. Next, the second reference block is obtained by extending the first reference block. For example, N rows of integral pixel are respectively filled on an upper edge and a lower edge of the first reference block, and N columns of integral pixel are respectively filled on a left edge and a right edge of the first reference block, so as to obtain the second reference block. Assume N is 1, the size of the second reference block is 18*18, and assume N is 2, the size of the second reference block is 20*20 and so on. Subsequent descriptions are made with the size of the second reference block being18*18 as an example. The third reference block may be determined from the second reference picture according to the second unidirectional motion information of the sub-block unit 1, and the size of the third reference block is 16*16. Next, the fourth reference block is obtained by extending the third reference block. For example, N rows of integral pixels are respectively filled on an upper edge and a lower edge of the third reference block, and N columns of integral pixels are respectively filled on a left edge and a right edge of the third reference block, so as to obtain the fourth reference block. Assume N is 1, the size of the fourth reference block is 18*18, and assume N is 2, the size of the fourth reference block is 20*20 and so on. Subsequent descriptions are made with the size of the fourth reference block being 18*18 as an example.

In some examples, if the current block is a bidirectional block (i.e., the current block is a block adopting bidirectional prediction), bidirectional motion information corresponding to the current block may be obtained, and the obtaining manner thereof is not limited herein. The bidirectional motion information may include motion information of two different directions, the motion information of two different directions is called first unidirectional motion information (e.g., a first motion vector and a first reference picture index) and second unidirectional motion information (e.g., a second motion vector and a second reference picture index). Based on the first unidirectional motion information, a first reference picture (e.g., reference picture 0) may be determined, and the first reference picture is displayed earlier than a current picture where the current block is; based on the second unidirectional motion information, a second reference picture (e.g., reference picture 1) may be determined, and the second reference picture is displayed later than the current picture.

In some examples, for each sub-block unit of the current block, the first unidirectional motion information of the sub-block unit is identical to the first unidirectional motion information of the current block, and the second unidirectional motion information of the sub-block unit is identical to the second unidirectional motion information of the current block.

For each sub-block (with a sub-block 11 as an example below) of the sub-block unit 1, a first target reference block corresponding to the sub-block 11 is selected from the second reference block with a size of 18*18, the size of the sub-block 11 may be 4*4, the size of the first target reference block may be 6*6, and first original prediction values of the sub-block 11 are determined according to pixel values of the first target reference block. A second target reference block corresponding to the sub-block 11 is selected from the fourth reference block with a size of 18*18, the size of the second target reference block may be 6*6, and second original prediction values corresponding to the sub-block 11 is determined according to pixel values of the second target reference block.

At step 303, the decoder determines a horizontal direction rate of the sub-block according to the first original prediction values and the second original prediction values.

For example, the decoder determines a coefficient S1 and a coefficient S3 according to the first original prediction values and the second original prediction values; determines the horizontal direction rate of the sub-block according to the coefficient S1, the coefficient S3 and a rate threshold.

At step 304, the decoder determines a vertical direction rate of the sub-block according to the first original prediction values and the second original prediction values.

For example, the decoder determines a coefficient S2, a coefficient S5 and a coefficient S6 according to the first original prediction values and the second original prediction values; determines the vertical direction rate of the sub-block according to the coefficient S2, the coefficient S5, the coefficient S6, the rate threshold and the horizontal direction rate of the sub-block.

At step 305, the decoder obtains prediction compensation offsets of the sub-block according to the horizontal direction rate and the vertical direction rate.

At step 306, the decoder obtains target prediction values of the sub-block according to the first original prediction values, the second original prediction values and the prediction compensation offsets.

In some examples, in steps 305 and 306, for each pixel position of the sub-block, a first horizontal direction gradient and a first vertical direction gradient corresponding to the pixel position in the first reference picture may be determined, and a second horizontal direction gradient and a second vertical direction gradient corresponding to the pixel position in the second reference picture may be determined.

Next, according to the first horizontal direction gradient, the second horizontal direction gradient, the first vertical direction gradient, the second vertical direction gradient, the horizontal direction rate (i.e. the horizontal direction rate of the sub-block, where each pixel position in the sub-block corresponds to a same horizontal direction rate), the vertical direction rate (i.e. the vertical direction rate of the sub-block, where each pixel position in the sub-block corresponds to a same vertical direction rate) corresponding to the pixel position, a prediction compensation offset of the pixel position may be determined, and then, according to the first original prediction value, the second original prediction value and the prediction compensation offset corresponding to the pixel position, a target prediction value of the pixel position may be obtained.

In some examples, for each sub-block, after the target prediction values of each pixel position of the sub-block are obtained, the target prediction values of these pixel positions may be combined to obtain the target prediction values of the sub-block.

At step 307, the decoder determines prediction values of the current block according to the target prediction values of each sub-block.

Figure 4:
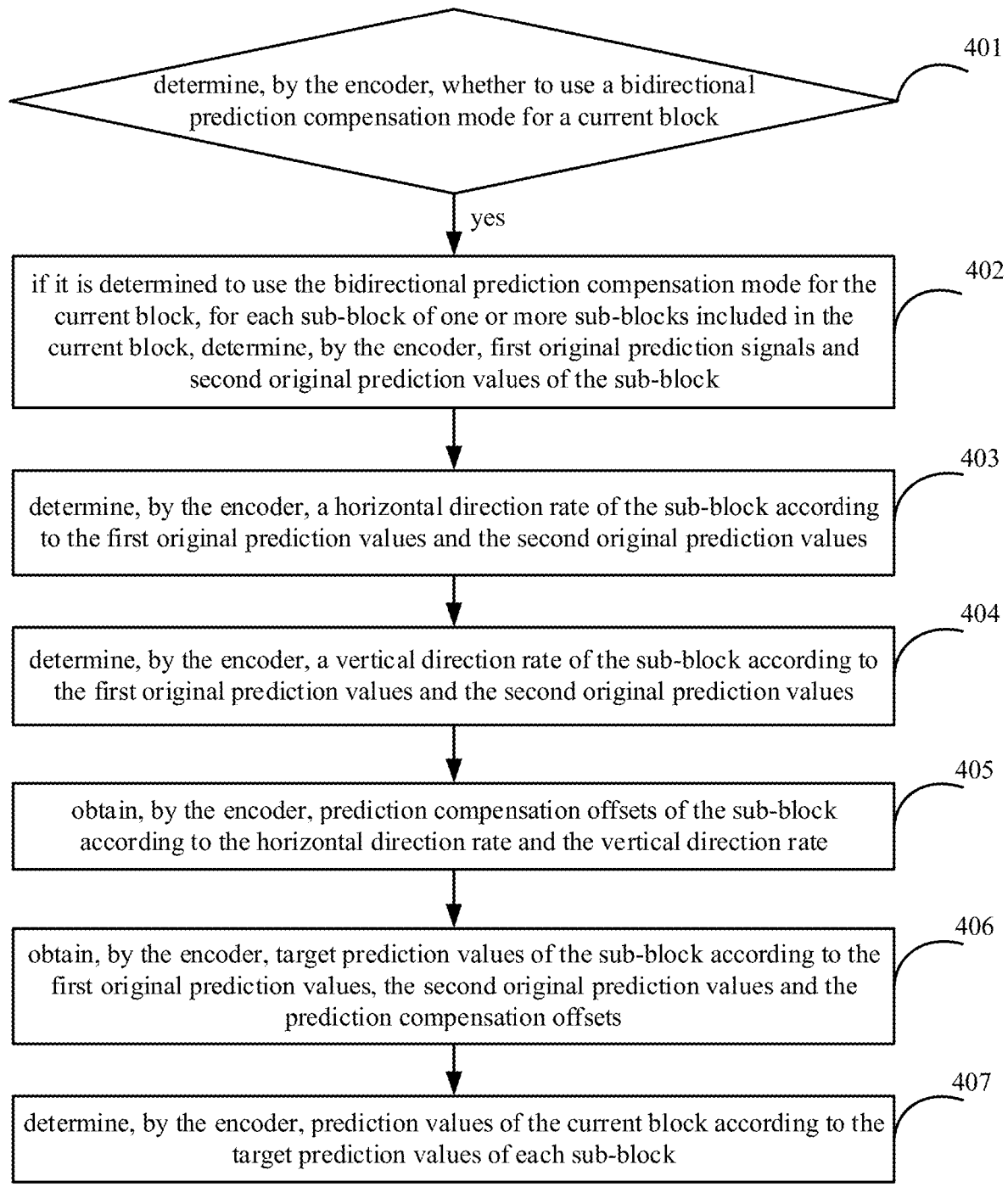
FIG. 4 is a flowchart illustrating an encoding and decoding method according to another embodiment of the present disclosure.

Embodiment 3: based on the same idea as the above method, as shown in FIG. 4, a flow chart illustrating another encoding and decoding method according to an embodiment of the present disclosure is provided. The method may be applied to an encoder. The method may include the following steps.

At step 401, the encoder determines whether to use a bidirectional prediction compensation mode for a current block; if yes, step 402 is performed; if not, the bidirectional prediction compensation mode provided in the present disclosure is not adopted, which is not limited for this specific processing.

In some examples, if the encoder determines to use the bidirectional prediction compensation mode for the current block, it indicates that the prediction values obtained based on the motion information is not accurate. Therefore, the bidirectional prediction compensation mode (the technical solution of the present disclosure) is used for the current block, and step 402 is performed. If the encoder determines not to use the bidirectional prediction compensation mode for the current block, it indicates that the prediction values obtained based on the motion information is sufficiently accurate, and thus the bidirectional prediction compensation mode is not used for the current block.

At step 402, if it is determined to use the bidirectional prediction compensation mode for the current block, for each sub-block of one or more sub-blocks included in the current block, the encoder determines first original prediction values and second original prediction values of the sub-block.

At step 403, the encoder determines a horizontal direction rate of the sub-block according to the first original prediction values and the second original prediction values.

At step 404, the encoder determines a vertical direction rate of the sub-block according to the first original prediction values and the second original prediction values.

At step 405, the encoder obtains a prediction compensation offset of the sub-block according to the horizontal direction rate and the vertical direction rate.

At step 406, the encoder obtains target prediction values of the sub-block according to the first original prediction values, the second original prediction values and the prediction compensation offsets.

At step 407, prediction values of the current block are determined according to the target prediction values of each sub-block.

In some examples, steps 401 to 407 may be referred to steps 301 to 307 and will not be repeated herein.

Embodiment 4: in the embodiments 1 to 3, all the embodiments are about determination whether to use the bidirectional prediction compensation mode for the current block. In combination with the embodiment 4, the process of enabling the bidirectional prediction compensation mode is described below. In a possible implementation, the following enabling conditions may be given. Of course, the following enabling conditions are merely an example of the present disclosure, and in practice, these enabling conditions may be combined arbitrarily, which is not limited herein.

In some examples, when the following enabling conditions are all satisfied, it is determined to use the bidirectional prediction compensation mode for the current block. When any one or more of the following enabling conditions are not satisfied, it is determined not to enable the bidirectional prediction compensation mode for the current block.

1. Control information allows the current block to enable the bidirectional prediction compensation mode.

In some examples, the control information may include but not limited to: sequence-level control information and/or picture-level control information.

In a possible implementation, the sequence-level (e.g., several pictures) control information may include but not limited to: control flag (e.g., sps_cur_tool_enabled_flag), and the picture-level (e.g., one picture) control information may include but not limited to: control flag (e.g., pic_cur_tool_disabled_flag). When a value of sps_cur_tool_enabled_flag is a first value, and a value of pic_cur_tool_disabled_flag is a second value, it indicates that the current block is allowed to enable the bidirectional prediction compensation mode.

sps_cur_tool_enabled_flag indicates whether all images in a sequence allow enabling the bidirectional prediction compensation mode. pic_cur_tool_disabled_flag indicates whether each block in a current picture is disallowed to enable the bidirectional prediction compensation mode.

For example, when a value of sps_cur_tool_enabled_flag is the first value, it indicates that all images in a sequence allow enabling the bidirectional prediction compensation mode. When a value of pic_cur_tool_disabled_flag is the second value, it indicates that each block in a current picture is allowed to enable the bidirectional prediction compensation mode. For another example, when a value of sps_cur_tool_enabled_flag is the second value, and/or, a value of pic_cur_tool_disabled_flag is the first value, it indicates that the current block is disallowed to enable the bidirectional prediction compensation mode, namely, the control information disallows the current block to enable the bidirectional prediction compensation mode.

In another possible implementation, the sequence-level (e.g. several pictures) control information may include but not limited to: control flag bit (e.g. sps_cur_tool_disabled_flag), and the picture-level (e.g. one picture) control information may include but not limited to: control flag bit (e.g. pic_cur_tool_disabled_flag). When a value of sps_cur_tool_disabled_flag is a second value, and a value of pic_cur_tool_disabled_flag is a second value, it indicates that the current block is allowed to enable the bidirectional prediction compensation mode.

sps_cur_tool_disabled_flag indicates whether all images in a sequence disallow enabling the bidirectional prediction compensation mode. pic_cur_tool_disabled_flag indicates whether each block in a current picture is disallowed to enable the bidirectional prediction compensation mode.

For example, when a value of sps_cur_tool_disabled_flag is the second value, it indicates that all images in a sequence allow enabling the bidirectional prediction compensation mode. When a value of pic_cur_tool_disabled_flag is the second value, it indicates that each block in a current picture is allowed to enable the bidirectional prediction compensation mode. For another example, when a value of sps_cur_tool_disabled_flag is the first value and/or a value of pic_cur_tool_disabled_flag is the first value, it indicates that the current block is disallowed to enable the bidirectional prediction compensation mode, namely, the control information disallows the current block to enable the bidirectional prediction compensation mode.

In another possible implementation, the sequence-level (e.g., several pictures) control information may include but not limited to: control flag (e.g., sps_cur_tool_enabled_flag), and the picture-level (e.g., one pictures) control information may include but not limited to: control flag (e.g., pic_cur_tool_enabled_flag. When a value of sps_cur_tool_ enabled_flag is the first value, and a value of pic cur tool enabled flag is the first value, it indicates that the current block is allowed to enable the bidirectional prediction compensation mode.

sps_cur_tool_enabled_flag indicates whether all images in a sequence allow enabling the bidirectional prediction compensation mode. pic_cur_tool_enabled_flag indicates whether each block in a current picture is allowed to enable the bidirectional prediction compensation mode.

For example, when a value of sps_cur_tool_enabled_flag is the first value, it indicates that all images in a sequence allow enabling the bidirectional prediction compensation mode. When a value of pic_cur_tool_enabled_flag is the first value, it indicates that each block in a current picture is allowed to enable the bidirectional prediction compensation mode. For another example, when a value of sps_cur_tool_enabled_flag is the second value and/or a value of pic_cur_tool_enabled_flag is the second value, it indicates that the current block is disallowed to enable the bidirectional prediction compensation mode, namely, the control information disallows the current block to enable the bidirectional prediction compensation mode.

In another possible implementation, the sequence-level (e.g., several pictures) control information may include but not limited to: control flag (e.g., sps_cur_tool_disabled_flag), and the picture-level (e.g., one picture) control information may include but not limited to: control flag bit (e.g., pic_cur_tool_enabled_flag). When a value of sps_cur_tool_disabled_flag is the second value, and a value of pic_cur_tool_enabled_flag is the first value, it indicates that the current block is allowed to enable the bidirectional prediction compensation mode.

sps_cur_tool_disabled_flag indicates whether all images in a sequence disallow enabling the bidirectional prediction compensation mode. pic_cur_tool_enabled_flag indicates whether each block in a current picture is allowed to enable the bidirectional prediction compensation mode.

For example, when a value of sps_cur_tool_disabled_flag is the second value, it indicates that all images in a sequence allow enabling the bidirectional prediction compensation mode. When a value of pic_cur_tool_enabled_flag is the first value, it indicates that each block in a current picture is allowed to enable the bidirectional prediction compensation mode. For another example, when a value of sps_cur_tool_disabled_flag is the first value and/or a value of pic_cur_tool_enabled_flag is the second value, it indicates that the current block is disallowed to enable the bidirectional prediction compensation mode, namely, the control information disallows the current block to enable the bidirectional prediction compensation mode.

In the above embodiment, the first value may be 1, and the second value may be 0; or, the first value may be 0 and the second value may be 1. Of course, the above is only two examples of the present disclosure, which is not limited herein.

In some examples, in the present disclosure, a frame or a picture is equivalent to an image, for example, a current picture represents a current image, and a reference picture represents a reference image.

2. The current block adopts a parallel movement motion model.

In some examples, the current block adopts a parallel movement motion model, namely, a motion model index MotionModelIdc of the current block is 0, and the motion model index refers to a motion model index of a parallel movement motion model (i.e., a motion model with 2 parameters).

In some examples, the current block adopts the parallel movement motion model, which means that: the current block does not adopt a non-parallel movement motion model. In a possible implementation, the non-parallel movement motion model may include but not limited to an affine motion model with 4 or 6 parameters.

In some examples, if the current block does not adopt the parallel movement motion model, it indicates that the enabling condition 2 is not satisfied; optionally, if the motion model index MotionModelIdc of the current block is not 0, it indicates that the enabling condition 2 is not satisfied; optionally, if the current block adopts a non-parallel movement motion model (e.g., an affine motion model with 4 or 6 parameters), it indicates that the enabling condition 2 is not satisfied.

3. The prediction mode of the current block is not a sub-block mode, not a SMVD mode, and not a CIIP mode.

In some examples, if the prediction mode of the current block is not the sub-block mode (e.g., merge_subblock_flag of the current block is 0), the prediction mode of the current block is not the SMVD mode (e.g., sym_mvd_flag of the current block is 0), and the prediction mode of the current block is not the CIIP mode (e.g., ciip_flag of the current block is 0), it indicates that the current block is allowed to use the bidirectional prediction compensation mode.

For example, if the prediction mode (e.g., inter prediction mode) of the current block is a merge mode, or a skip mode, and the prediction mode of the current block is a regular merge model, it indicates that the prediction mode of the current block is not the sub-block mode, not the SMVD mode and not the CIIP mode. For example, if the prediction mode of the current block is the merge mode, or the skip mode, and the prediction mode of the current block is an MMVD mode, it indicates that the prediction mode of the current block is not the sub-block mode, not the SMVD mode and not the CIIP mode. For example, if the prediction mode of the current block is the merge mode, or the skip mode, and the prediction mode of the current block is a TPM mode, it indicates that the prediction mode of the current block is not the sub-block mode, not the SMVD mode and not the CIIP mode. For example, if the prediction mode of the current block is the merge mode, or the skip mode, and the prediction mode of the current block is a GEO mode, it indicates that the prediction mode of the current block is not the sub-block mode, not the SMVD mode and not the CIIP mode. Of course, the above is merely several examples which are not limited herein.

In some examples, if the prediction mode of the current block is the sub-block mode, it indicates that the current block is disallowed to use the bidirectional prediction compensation mode, that is, the enabling condition 3 is not satisfied; optionally, if the prediction mode of the current block is the SMVD mode, it indicates that the current block is disallowed to use the bidirectional prediction compensation mode, that is, the enabling condition 3 is not satisfied; optionally, if the prediction mode of the current block is the CIIP mode, it indicates that the current block is disallowed to use the bidirectional prediction compensation mode, that is, the enabling condition 3 is not satisfied.

4. The prediction values of the current block are obtained by use of a weighted sample prediction process on reference blocks (i.e., prediction blocks) of two reference pictures, the two reference pictures are displayed earlier than and later than a current picture respectively, and the two reference pictures have a same distance from the current picture.

In some examples, obtaining the prediction values of the current block by use of a weighted sample prediction process on reference blocks of two reference pictures means that, the current block adopts bidirectional prediction, that is, the prediction values of the current block are obtained by use of a weighted sample prediction process on reference blocks of two reference pictures.

In some examples, the current block may correspond to two motion information lists, which is denoted as first motion information and second motion information, the first motion information includes a first reference picture and a first original motion vector, and the second motion information includes a second reference picture and a second original motion vector. The two reference pictures are displayed earlier than and later than a current picture, which refers to that: the first reference picture is located earlier than the current picture where the current block is, and the second reference picture is located later than the current picture.

In a possible implementation, the current picture has two motion information (e.g., two reference pictures and two motion vectors) lists (e.g., list0 and list1), the two reference pictures are displayed earlier than and later than the current picture respectively, and the two reference pictures have a same distance from the current picture, it indicates that the current block is allowed to use the bidirectional prediction compensation mode.

The two reference pictures are displayed earlier than and later than the current picture respectively and the two reference pictures have a same distance from the current picture. The above can be represented by the following relative relationship of a display sequence number POC_Cur of the current picture, a display sequence number POC_0 of the reference picture of list0, and a display sequence number POC_1 of the reference picture of list1:(POC_1-POC_Cur) is completely equal to (POC_Cur-POC_0).

In some examples, the current block adopts bidirectional prediction and the two reference pictures corresponding to the current block come from different directions, that is, one reference picture corresponding to the current block is located earlier than the current picture, and the other reference picture corresponding to the current block is located later than the current picture.

In some examples, if the current block has one reference picture, it indicates that the current block is disallowed to use the bidirectional prediction compensation mode, that is, the enabling condition 4 is not satisfied. Optionally, if the current block has two reference pictures but the two reference pictures are both displayed earlier than the current picture, it indicates that the current block is disallowed to use the bidirectional prediction compensation mode, that is, the enabling condition 4 is not satisfied. Optionally, if the current block has two reference pictures but the two reference pictures are both displayed later than the current picture, it indicates that the current block is disallowed to use the bidirectional prediction compensation mode, that is, the enabling condition 4 is not satisfied. Optionally, if the current block has two reference pictures, the two reference pictures are displayed earlier than and later than the current picture respectively, but the two reference pictures have different distances from the current picture, it indicates that the current block is disallowed to use the bidirectional prediction compensation mode, that is, the enabling condition 4 is not satisfied.

5. The two reference pictures of the current block have a same weight.

In a possible implementation, if the two reference pictures of the current block have a same weight, it indicates that the current block is allowed to use the bidirectional prediction compensation mode. In some examples, if the two reference pictures have a same picture-level weight, for example, a luma weight (luma_weight_l0_flag[refIdxL0]) of the reference picture refIdxL0 may be equal to a luma weight (luma_weight_l1_flag[refIdxL1]) of the reference picture refIdxL1, it indicates that the two reference pictures of the current block have a same weight. Optionally, if the two reference pictures have a same block-level weight, for example, an index BcwIdx[xCb][yCb] of a block-level weighted value of the current block is 0, it indicates that the two reference pictures of the current block have a same weight. Optionally, if the two reference pictures have a same picture-level weight and a same block-level weight, it indicates that the two reference pictures of the current block have a same weight.

In some examples, if the two reference pictures of the current block have different weights, it indicates that the current block is disallowed to use the bidirectional prediction compensation mode, that is, the enabling condition 5 is not satisfied. For example, the two reference pictures have different picture-level weights, it indicates that the two reference pictures of the current block have different weights. Optionally, if the two reference pictures have different block-level weights, it indicates that the two reference pictures of the current block have different weights. Optionally, if the two reference pictures have different picture-level weights and the two reference pictures have different block-level weights, it indicates that the two reference pictures of the current block have different weights.

In some examples, the weights of the two reference pictures of the current block refer to weights adopted for bidirectional weighted compensation. For example, for each sub-block of the current block, after two sets of prediction values of the sub-block are obtained (the obtaining process may be referred to subsequent embodiments), it is required to perform weighting on the two set of prediction values to obtain final prediction values of the sub-block. When weighting is performed on the two set of prediction values, the weights corresponding to the two sets of prediction values are the weights of the two reference pictures of the current block, that is, the weights corresponding to the two sets of prediction values are same.

6. The two reference pictures of the current block are both short-term reference pictures, or, neither of the two reference pictures of the current block is a long-term reference picture.

In a possible implementation, if the two reference pictures of the current block are both short-term reference pictures, it indicates that the current block is allowed to use the bidirectional prediction compensation mode. The short-term reference picture represents a reference picture closer to the current picture, and generally is an actual picture.

In some examples, if the two reference pictures of the current block both are not short-term reference pictures, it indicates that the current block is disallowed to use the bidirectional prediction compensation mode, that is, the enabling condition 6 is not satisfied. Optionally, if one reference picture of the current block is not a short-term reference picture, it indicates that the current block is disallowed to use the bidirectional prediction compensation mode, that is, the enabling condition 6 is not satisfied. Optionally, if neither of the two reference pictures of the current block is a short-term reference picture, it indicates that the current block is disallowed to use the bidirectional prediction compensation mode, that is, the enabling condition 6 is not satisfied.

In a possible implementation, neither of the two reference pictures of the current block is a long-term reference picture, it indicates that the current block is allowed to use the bidirectional prediction compensation mode. A display sequence number POC of the long-term reference picture does not have actual meaning (this will lead to failure of condition 4), and the long-term reference picture represents a reference picture farther from the current picture, or a picture synthesized by several actual pictures.

In some examples, if one reference picture of the current block is a long-term reference picture, it indicates that the current block is disallowed to use the bidirectional prediction compensation mode, that is, the enabling condition 6 is not satisfied. Optionally, if the two reference pictures of the current block both are long-term reference pictures, it indicates that the current block is disallowed to use the bidirectional prediction compensation mode, that is, the enabling condition 6 is not satisfied.

7. The width, the height and the area of the current block are all within defined ranges.

In a possible implementation, if the width cbWidth of the current block is greater than or equal to a first threshold (e.g., 8), the height cbHeight of the current block is greater than or equal to a second threshold (e.g., 8), and the area (cbHeight*cbWidth) of the current block is greater than or equal to a third threshold (e.g., 128), it indicates that the current block is allowed to use the bidirectional prediction compensation mode.

In some examples, if the width cbWidth of the current block is less than the first threshold, it indicates that the current block is disallowed to use the bidirectional prediction compensation mode, that is, the enabling condition 7 is not satisfied. Optionally, if the height cbHeight of the current block is less than the second threshold, it indicates that the current block is disallowed to use the bidirectional prediction compensation mode, that is, the enabling condition 7 is not satisfied. Optionally, if the area of the current block is less than the third threshold, it indicates that the current block is disallowed to use the bidirectional prediction compensation mode, that is, the enabling condition 7 is not satisfied.

In another possible implementation, if the width cbWidth of the current block is greater than or requal to the first threshold (e.g., 8), the height cbHeight of the current block is greater than or equal to the second threshold (e.g., 8), and the area (cbHeight*cbWidth) of the current block is greater than a fourth threshold (e.g., 64), it indicates that the current block is allowed to use the bidirectional prediction compensation mode.

In some examples, if the width cbWidth of the current block is less than the first threshold, it indicates that the current block is disallowed to use the bidirectional prediction compensation mode, that is, the enabling condition 7 is not satisfied. Optionally, if the height cbHeight of the current block is less than the second threshold, it indicates that the current block is disallowed to use the bidirectional prediction compensation mode, that is, the enabling condition 7 is not satisfied. Optionally, if the area of the current block is less than or equal to the fourth threshold, it indicates that the current block is disallowed to use the bidirectional prediction compensation mode, that is, the enabling condition 7 is not satisfied.

8. The two reference pictures of the current block are identical in size to the current picture (equal in width and length).

In a possible implementation, if the size of the reference picture of list0 is identical to that of the current picture, for example, the width of the reference picture of list0 is identical to that of the current picture and the height of the reference picture of list0 is identical to that of the current picture, and the size of the reference picture of the list1 is identical to that of the current picture, for example, the width of the reference picture of list1 is identical to that of the current picture and the height of the reference picture of list1 is identical to that of the current picture, it indicates that the current block is allowed to use the bidirectional prediction compensation mode.

In some examples, if the size of at least one reference picture of the two reference pictures of the current block is different from that of the current picture, it indicates that the current block is disallowed to use the bidirectional prediction compensation mode, that is, the enabling condition 8 is not satisfied. Optionally, if the width of the reference picture of list0 is different from that of the current picture, it indicates that the current block is disallowed to use the bidirectional prediction compensation mode. Optionally, if the height of the reference picture of list0 is different from that of the current picture, it indicates that the current block is disallowed to use the bidirectional prediction compensation mode. Optionally, if the width of the reference picture of list1 is different from that of the current picture, it indicates that the current block is disallowed to use the bidirectional prediction compensation mode. Optionally, if the height of the reference picture of list1 is different from that of the current picture, it indicates that the current block is disallowed to use the bidirectional prediction compensation mode.

9. The current block only performs luma component prediction compensation, that is, a luma component is to be subjected to prediction compensation.

In some examples, a pixel value of each pixel position of the current block may include a luma component and two chroma components. When motion compensation based on the bidirectional prediction compensation mode is performed for the pixel value of each pixel position of the current block, if motion compensation is to be performed for the luma component of the pixel value, that is, the current component is the luma component, it indicates that the current block is allowed to use the bidirectional prediction compensation mode.

In some examples, when motion compensation is performed for the pixel value of each pixel position of the current block, if motion compensation is to be performed for the chroma components of the pixel value, that is, the current component is the chroma component, it indicates that the current block is disallowed to use the bidirectional prediction compensation mode, that is, the enabling condition 9 is not satisfied.

Embodiment 5: FIG. 5 is a flowchart illustrating an encoding and decoding method according to an embodiment of the present disclosure. The encoding and decoding method may be applied to a decoder or an encoder. The encoding and decoding method may include the following steps.

At step 501, if the following conditions are all satisfied, it is determined to use a bidirectional prediction compensation mode for a current block:

control information allows the current block to enable the bidirectional prediction compensation mode;

the current block adopts a parallel movement motion model;

a prediction mode of the current block is not a sub-block mode, not an SMVD mode and not a CIIP mode;

prediction values of the current block are obtained by use of a weighted sample prediction process on reference blocks of two reference pictures, and the two reference pictures are displayed respectively earlier than and later than a current picture, and the two reference pictures have a same distance from the current picture;
the two reference pictures of the current block have a same weight;
the two reference pictures of the current block both are short-term reference pictures;
a width, a height and an area of the current block are all within defined ranges;
the two reference pictures of the current block are identical in size to the current picture.

In a possible implementation, if one of the following conditions is not satisfied, it is determined not to use the bidirectional prediction compensation mode for the current block: control information allows a current block to enable the bidirectional prediction compensation mode;
the current block adopts a parallel movement motion model;
a prediction mode of the current block is not a sub-block mode, not an SMVD mode and not a CIIP mode;
prediction values of the current block are obtained by use of a weighted sample prediction process on reference blocks of two reference pictures, and the two reference pictures are displayed respectively earlier than and later than a current picture, and the two reference pictures have a same distance from the current picture;
the two reference pictures of the current block have a same weight;
the two reference pictures of the current block both are short-term reference pictures;
a width, a height and an area of the current block are all within defined ranges;
the two reference pictures of the current block are identical in size to the current picture.

In the above embodiment, eight conditions are given and based on whether the eight conditions are satisfied at the same time, whether to use the bidirectional prediction compensation mode for the current block is determined.

In practice, some conditions may be selected from the eight conditions, and then whether to use the bidirectional prediction compensation mode for the current block is determined based on the selected some conditions. For example, five conditions are selected from the eight conditions, which is not limited herein, and thus may also be any five conditions. If the selected five conditions are all satisfied, it is determined to use the bidirectional prediction compensation mode for the current block; if any one of the selected five conditions is not satisfied, it is determined not to use the bidirectional prediction compensation mode for the current block. Of course, another number of conditions may be selected from the eight conditions, which is not limited herein.

At step 502, if it is determined to use the bidirectional prediction compensation mode for the current block, motion compensation based on the bidirectional prediction compensation mode is performed for the current block. The specific implementation process may be referred to step 202 and will not be repeated herein.

The implementation process of the Embodiment 5 may be referred to the embodiments 1 to 4, with a difference in that the enabling conditions of the bidirectional prediction compensation mode do not include "luma component prediction compensation is performed on the current block" and the implementation process will not be repeated herein.

In some examples, if the effect of performing prediction compensation for the chroma component of the current block using the bidirectional prediction compensation mode is good, chroma component prediction compensation may also be performed for the current block, that is, the enabling condition that "luma component prediction compensation is performed on the current block" is not needed and prediction compensation of the luma component and the chroma component is allowed to be performed for the current block.

Embodiment 6: the encoding and decoding method will be further described below in combination with specific applications scenarios. The encoding and decoding method may include the following steps.

At step a1, whether to use a bidirectional prediction compensation mode for a current block is determined; if yes, step a2 is performed.

In some examples, whether to use the bidirectional prediction compensation mode for the current block may be determined in the manner of Embodiment 1, or in the manner of Embodiment 5 or in the manner of Embodiment 4, which is not described herein again.

At step a2, the current block is partitioned into one or more sub-block units, a first reference block is determined from a first reference picture according to first unidirectional motion information of the sub-block unit, and a second reference block is obtained by extending the first reference block. A third reference block is determined from a second reference picture according to second unidirectional motion information of the sub-block unit, and a fourth reference block is obtained by extending the third reference block.

In some examples, the current block may include one sub-block unit (the sub-block unit is the current block), or the current block may include at least two sub-block units. For example, a width of the sub-block unit is dx, a height of the sub-block unit is dy, a width of the current block is W and a height of the current block is H. In this case, dx=W>a?a: W, dy—H>a? a:H. For example, If W is greater than a, dx is a, and if W is not greater than a, dx is W. If H is greater than a, dy is a, and if H is not greater than a, dy is H. The value of a may be configured according to experiences, for example, 4, 8, 16, and 32 and the like. For ease of descriptions, a=16 is taken as an example subsequently for descriptions. For example, if the size of the current block is 8*16, the current block only includes one sub-block unit, and the size of the sub-block unit is 8*16. For another example, if the size of the current block is 8*32, the current block includes a sub-block unit 1 and a sub-block unit 2, and the sizes of the sub-block unit 1 and the sub-block unit 2 are both 8*16. For another example, if the size of the current block is 16*32, the current block includes a sub-block unit 1 and a sub-block unit 2, and the sizes of the sub-block unit 1 and the sub-block unit 2 are both 16*16. Of course, the above are merely several examples, which is not limited herein. For ease of descriptions, descriptions will be made below with the current block including a sub-block unit 1 and a sub-block unit 2, each of which has a size of 16*16, as an example.

In some examples, if the current block is a bidirectional block (i.e., the current block is a block adopting bidirectional prediction), bidirectional motion information corresponding to the current block may be obtained, and the obtaining manner thereof is not limited herein. The bidirectional motion information may include motion information of two different directions, the motion information of two different directions is called first unidirectional motion information (e.g., a first motion vector and a first reference picture index) and second unidirectional motion information (e.g., a second motion vector and a second reference picture index). For each sub-block unit of the current block, first unidirectional motion information of the sub-block unit is identical to the first unidirectional motion information of the current block, and second unidirectional motion information of the sub-block unit is identical to the second unidirectional motion information of the current block. Based on the first unidirectional motion information, the first reference picture (e.g., reference picture 0) may be determined, and the first reference picture is displayed earlier than a current picture where the current block is; based on the second unidirectional motion information, the second reference picture (e.g., reference picture 1) may be determined, and the second reference picture is displayed later than the current picture where the current block is.

For each sub-block unit (with the sub-block unit 1 as an example below), a first reference block is determined from a first reference picture based on the first unidirectional motion information of the sub-block unit 1, the size of the sub-block unit is dx*dy (e.g., 16*16), and the size of the first reference block is 16*16. Then, a second reference block is obtained by extending the first reference block, for example, filling of N rows/columns is performed at an upper edge, a lower edge, a left edge and a right edge of the first reference block (N may be 0, 1, 2, 3, and 4 and the like; when N is 0, no filling is performed). For example, N rows of integral pixels are filled at the upper and lower edges of the first reference block respectively, and N columns of integral pixel are filled at the left and right edges of the first reference block respectively, so as to obtain the second reference block, where the size of the second reference block is (16+2N)*(16+2N).

In a possible implementation, the method of filing the N rows/columns of integral pixel may be copying from neighboring integral pixel region of the first reference picture. For example, pixel values of the N rows of integral pixels and pixel values of N columns of integral pixels in the second reference block are obtained by copying pixel values of neighboring integral pixel positions in the first reference picture.

For example, If N is 1, one row of integral pixels is filled at the upper edge of the first reference block, one row of integral pixels is filled at the lower edge of the first reference block, one column of integral pixels is filled at the left edge of the first reference block and one column of integral pixels is filled at the right edge of the first reference block, so as to obtain the second reference block. The size of the second reference block is 18*18.

In some examples, when a horizontal component of a gradient value of a pixel position is determined, it is required to use a pixel value of a pixel position at the left side of the pixel position and a pixel value of a pixel position at the right side of the pixel position; when a vertical component of the gradient value of the pixel position is determined, it is required to use a pixel value of a pixel position above the pixel position and a pixel value of a pixel position below the pixel position; a pixel position at an edge of the first reference block may lack a pixel position of at least one side. For example, for a pixel position at the upper edge of the first reference block, there is no above pixel position present in the first reference block; for a pixel position at the left edge of the first reference block, there is no left pixel position present in the first reference block. Therefore, in order to determine the gradient value of each pixel position, it is required to fill N rows/columns of integral pixel positions (pixel value is an integer) at the upper, lower, left and right edges of the first reference block.

In some examples, in order to reduce bandwidth increase, the pixel values of the filled rows/columns of integral pixel positions may be obtained by directly copying pixel values of neighboring integral pixel positions of the first reference picture. For example, an integral pixel block of equal size (a block formed by integral pixel positions) closest to the first reference block may be determined in the first reference picture; then, pixel values of N rows/columns of integral pixel positions nearest around the integral pixel block are taken as filling values of the upper, lower, left and right edges of the first reference block respectively.

In some examples, filling N rows/columns of integral pixel positions at the upper, lower, left and right edges of the first reference block may include: filling the N rows/columns of integral pixel positions at the directly upper, lower, left and right sides of the integral pixel block respectively.

For example, after N rows/columns of integral pixel positions are filled at the upper, lower, right and left edges of the first reference block, a block with a width and a height both increased by 2N may be obtained. Based on the pixel value of each pixel position in the block, when a gradient value of each pixel position in the original first reference block is calculated, corner points of each layer of pixel positions in the N layers of pixel positions outside the block will not be used. Therefore, in order to reduce the filling workload and improve the filling efficiency, when N rows/columns of integral pixel positions are filled at the upper, lower, left and right edges of the first reference block respectively, N rows/columns of integral pixel positions may be filled respectively at the directly upper, lower, left and right sides of an integral pixel block of equal size closest to the first reference block in the first reference picture.

When N=1, filling N rows/columns of integral pixel positions at the upper, lower, left and right edges of the first reference block respectively may include the followings.

As shown in FIG. 6A, in a case that a horizontal component and a vertical component of a fractional pixel of a prediction value of a pixel position in the first reference block are both greater than or equal to a half pixel, nearest integral pixel positions above are filled at the upper edge of the first reference block, secondary nearest integral pixel positions below are filled at the lower edge of the first reference block, nearest integral pixel positions at the left side are filled at the left edge of the first reference block, and secondary nearest integral pixel positions at the right side are filled at the right edge of the first reference block.

As shown in FIG. 6B, in a case that a horizontal component of a fractional pixel of a prediction value of a pixel position in the first reference block is greater than or equal to a half pixel and a vertical component is less than a half pixel, next-nearest integral pixel positions above are filled at the upper edge of the first reference block, nearest integral pixel positions below are filled at the lower edge of the first reference block, nearest integral pixel positions at the left side are filled at the left edge of the first reference block, and secondary nearest integral pixel positions at the right side are filled at the right edge of the first reference block.

Figure 6C:
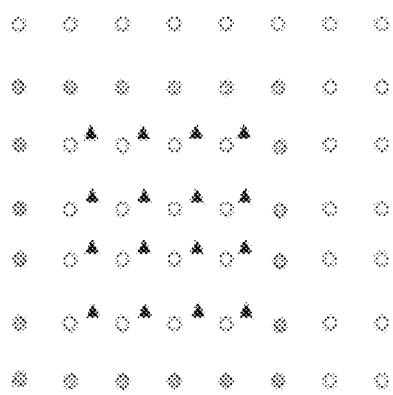

As shown in FIG. 6C, in a case that a horizontal component of a fractional pixel of a prediction value of a pixel position in the first reference block is less than a half pixel and a vertical component is greater than or equal to a half pixel, nearest integral pixel positions above are filled at the upper edge of the first reference block, secondary nearest integral pixel positions below are filled at the lower edge of the first reference block, secondary nearest integral pixel positions at the left side are filled at the left edge of the first reference block, and nearest integral pixel positions at the right side are filled at the right edge of the first reference block.

Figure 6D:
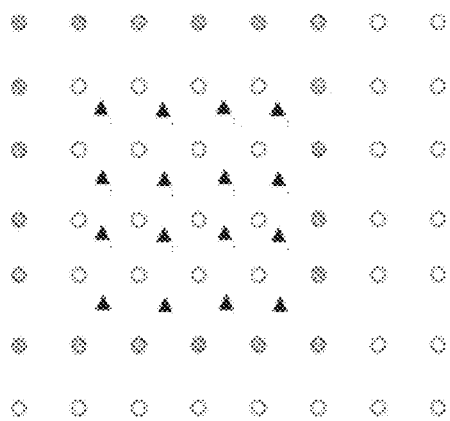

As shown in FIG. 6D, in a case that a horizontal component and a vertical component of a fractional pixel of a prediction value of a pixel position in the first reference block are both less than a half pixel, secondary nearest integral pixel positions above are filled at the upper edge of the first reference block, nearest integral pixel positions below are filled at the lower edge of the first reference block, secondary nearest integral pixel positions at the left side are filled at the left edge of the first reference block, and nearest integral pixel positions at the right side are filled at the right edge of the first reference block.

In some examples, in FIGS. 6A to 6D, a triangle is a prediction value of each pixel position of the first reference block, a circle is a reconstruction value of an integral pixel position in the reference picture, and a circle with shade is a reconstruction value selected for filing an integral pixel position in the reference picture.

In FIGS. 6A to 6D, with the size of the first reference block being 4*4 as an example, a second reference block of 6*6 is obtained by filling the first reference block. When the size of the first reference block is 16*16, a second reference block of 18*18 is obtained by filling the first reference block. The specific filling manner may be referred to FIGS. 6A to 6D and will not be repeated herein.

In another possible implementation, the method of filling N rows/columns of integral pixel may be that nearest neighboring pixel values in the first reference block are directly copied, that is, the pixel values of N rows of integral pixel and the pixel values of N columns of integral pixel in the second reference block are obtained by copying the pixel values of neighboring pixel in the first reference block.

Figure 6E:
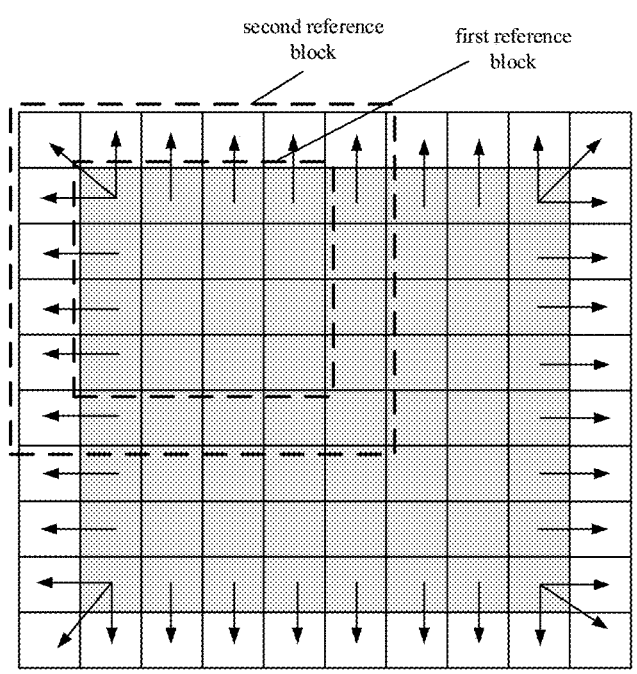

As shown in FIG. 6E, the second reference block may be obtained by copying the pixel values of the neighboring pixel in the first reference block. For example, when N rows/columns of integral pixel positions are filled at the upper, lower, left and right edges of the first reference block respectively, the pixel values of neighboring pixel in the first reference block may be directly copies. As shown in FIG. 6E, it is shown that a second reference block is obtained by copying the pixel values of the pixel positions in the first reference block to an edge region of the first reference block.

As shown in FIG. 6E, with the size of the first reference block being 4*4 as an example, a second reference block of 6*6 is obtained by filling the first reference block. When the size of the first reference block is 16*16, a second reference block of 18*18 is obtained by filling the first reference block. The specific filling manner may be referred to FIG. 6E and will not be repeated herein.

With reference to the above embodiments, the method of filling N rows/columns of integral pixel may be copying from a neighboring integral pixel region of the first reference picture (FIGS. 6A to 6D), or copying the nearest pixel values of the first reference block (FIG. 6E), that is, filling the N rows/columns of integral pixel directly by using the existing pixel values rather than performing interpolation for multiple pixel values and filling the N rows/columns of integral pixel using the pixel values obtained by interpolation. This way, additional interpolation process can be avoided and access to additional reference pixels can be indirectly avoided (in a case of adopting an interpolation manner, it is required to access additional reference pixels).

For each sub-block unit (with the sub-block unit 1 as an example below), a third reference block is determined from a second reference picture based on the second unidirectional motion information of the sub-block unit 1, the size of the sub-block unit is dx*dy (e.g., 16*16), and the size of the third reference block is 16*16. Then, a fourth reference block is obtained by extending the third reference block, for example, filling of N rows/columns are performed at an upper edge, a lower edge, a left edge and a right edge of the third reference block (N may be 0, 1, 2, 3, and 4 and the like; when N is 0, no filling is performed). For example, N rows of integral pixels are filled at the upper and lower edges of the third reference block respectively, and N columns of integral pixels are filled at the left and right edges of the third reference block respectively, so as to obtain the fourth reference block, where the size of the fourth reference block is (16+2N)*(16+2N).

In some examples, the method of filing the N rows/columns of integral pixels may be copying from neighboring integral pixel region of the second reference picture, or, copying nearest neighboring pixel values in the third reference block directly. For example, pixel values of the N rows of integral pixel and pixel values of N columns of integral pixel in the fourth reference block are obtained by copying pixel values of neighboring integral pixel positions in the second reference picture, or by copying the pixel values of neighboring pixel in the third reference block.

The specific filling manner may be referred to the filling manner of the first reference block and will not be repeated herein.

At step a3, for each sub-block of one or more sub-blocks included in the sub-block unit: a first target reference block corresponding to the sub-block is selected from the second reference block corresponding to the sub-block unit, and first original prediction values of the sub-block are determined according to pixel values of the first target reference block; a second target reference block corresponding to the sub-block is selected from the fourth reference block corresponding to the sub-block unit, and second original prediction values of the sub-block are determined according to pixel values of the second target reference block.

For example, for each sub-block unit of the current block, the sub-block unit may be partitioned into one or more sub-blocks, for example, when the size of the sub-block is 4*4 and the size of the sub-block unit is 16*16, the sub-block unit may be partitioned into 16 sub-blocks. For another example, when the size of the sub-block is 8*8, the sub-block unit may be partitioned into 4 sub-blocks. For another example, when the size of the sub-block is 16*16, the sub-block unit may be partitioned into 1 sub-block. Of course, the above is merely several examples, which is not limited herein. For ease of descriptions, descriptions will be made below with an example in which the sub-block unit is partitioned into 16 sub-blocks.

For each sub-block (with a sub-block 11 as an example below) of each sub-block unit (with a sub-block unit 1 as an example below) of dx*dy (e.g. 16*16), a first target reference block corresponding to the sub-block 11 may be selected from the second reference block (size of 18*18) corresponding to the sub-block unit 1, where the size of the sub-block 11 is 4*4 and the size of the first target reference block is 6*6; and first original prediction values of the sub-block 11 are determined according to pixel values of the first target reference block. A second target reference block corresponding to the sub-block 11 may be selected from the fourth reference block (size of 18*18) corresponding to the sub-block unit 1, where the size of the second target reference block is 6*6; and second original prediction values of the sub-block 11 are determined according to pixel values of the second target reference block.

Figure 7:
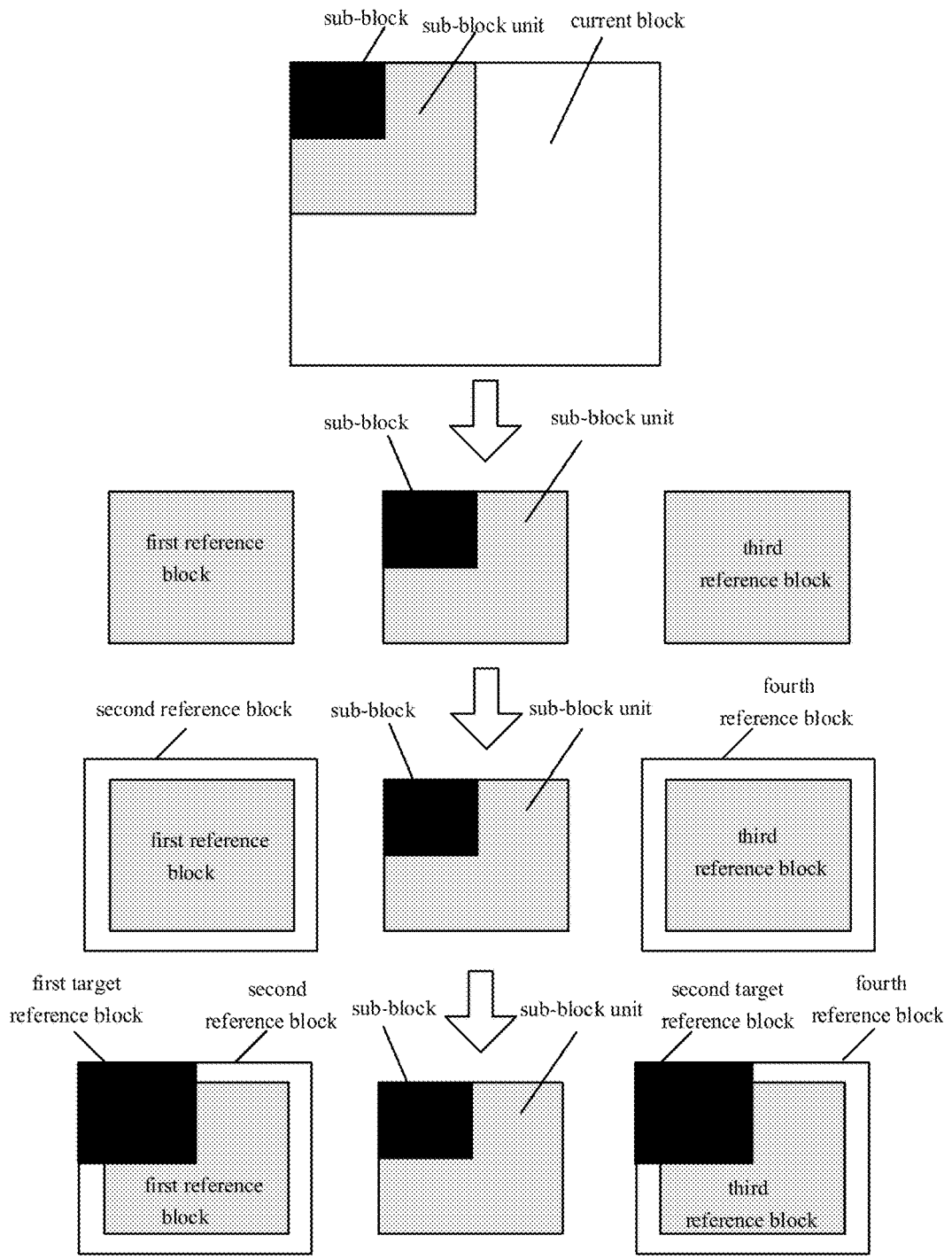
FIG. 7 is a schematic diagram illustrating a target reference block according to an embodiment of the present disclosure.

For example, as shown in FIG. 7, for each sub-block unit of dx*dy (e.g., 16*16), a first reference block with a size of 16*16 may be determined from the first reference picture (e.g., reference picture 0) according to the first unidirectional motion information of the sub-block unit, and a second reference block with a size of 18*18 is obtained by extending the first reference block. A third reference block with a size of 16*16 may be determined from the second reference picture (e.g., reference picture 1) according to the second unidirectional motion information of the sub-block unit, and a fourth reference block with a size of 18*18 is obtained by extending the third reference block. Next, for each sub-block (e.g., b*b, where b may be 4, 8, 16 or the like, and b=4 is taken as an example subsequently, that is, the size of the sub-block may be 4*4) of the sub-block unit, since it is required to determine a gradient of a target reference block corresponding to the sub-block in a subsequent process, a target reference block with a size of 6*6 is to be determined. For example, a first target reference block corresponding to the sub-block is selected from the second reference block corresponding to the sub-block unit, and first original prediction values of the sub-block are determined according to pixel values of the first target reference block; a second target reference block corresponding to the sub-block is selected from the fourth reference block corresponding to the sub-block unit, and second original prediction values of the sub-block are determined according to pixel values of the second target reference block.

As shown in FIG. 7, the pixel position of the sub-block is x=xSb, xSb+1, xSb+2 or xSb+3, y=ySb, ySb+1, ySb+2 or ySb+3, and the pixel position of the target reference block (e.g. the first target reference block, and the second target reference block etc.) corresponding to the sub-block is x=xSb, xSb+1, xSb+2, xSb+3, xSb+4 or xSb+5, y=ySb, ySb+1, ySb+2, ySb+3, ySb+4 or ySb+5. It can be seen that the pixel position (x, y) of the sub-block corresponds to the pixel position (x+1, y+1) of the target reference block. In some examples, xSb and ySb refer to an initial pixel position of the sub-block, for example, xSb=0, 4, 8 . . . dx/4*4−4, ySb=0, 4, 8 . . . dy/4*4−4 and the like. If dx=16, the initial pixel position of the sub-block may be 0, 4, 8, or 12. As an example, a range of a horizontal pixel position of the target reference block may be [0, dx+1], and a range of a vertical pixel position may be [0, dy+1].

As an example, the first original prediction values of the sub-block may be denoted as $I^{(0)}(x, y)$, the second original prediction values of the sub-block may be denoted as $I^{(1)}(x, y)$, and the first original prediction values and the second prediction values are both original prediction values with size of 6*6.

At step a4, a horizontal direction rate of the sub-block is determined according to the first original prediction values and the second original prediction values of the sub-block, that is, a horizontal direction (x direction) rate $v_x$ of pixels of the sub-block on the first reference picture is determined according to the first original prediction values and the second original prediction values. In some examples, a horizontal direction rate of pixels of the sub-block on the second reference picture is contrary to the horizontal direction rate of pixels of the sub-block on the first reference picture. For a pixel value (e.g., luma value) of each pixel position of the sub-block, the horizontal direction rates of the pixel values (e.g., luma values) of these pixel positions may be same, that is, the horizontal direction rate determined at step a4.

At step a5, a vertical direction rate of the sub-block is determined according to the first original prediction values and the second original prediction values of the sub-block, that is, a vertical direction (y direction) rate $v_y$ of pixels of the sub-block on the first reference picture is determined according to the first original prediction values and the second original prediction values. In some examples, a vertical direction rate of pixels of the sub-block on the second reference picture is contrary to the vertical direction rate of pixels of the sub-block on the first reference picture. For a pixel value (e.g., luma value) of each pixel position of the sub-block, the vertical direction rates of the pixel values (e.g., luma values) of these pixel positions may be same, that is, the vertical direction rate determined at step a5.

For steps a4 and a5, after the first original prediction values and the second original prediction values of the sub-block are obtained, a sum of horizontal direction gradients, a sum of vertical direction gradients, a luma difference of two reference blocks (i.e. a luma difference of two target reference blocks, which is also called temporal prediction value difference) are determined according to the first original prediction values and the second original prediction values of the sub-block. For an example, the sum of horizontal direction gradients is determined based on the formula (1), the sum of vertical direction gradients is determined based on the formula (2), and the luma difference of two reference blocks is determined based on the formula (3).

$$\psi_x(i, j) = \left(\frac{\partial P^{(1)}}{\partial x}(i, j) + \frac{\partial P^{(0)}}{\partial x}(i, j)\right) \gg \text{shift3} \quad (1)$$

$$\psi_y(i, j) = \left(\frac{\partial P^{(1)}}{\partial y}(i, j) + \frac{\partial P^{(0)}}{\partial y}(i, j)\right) \gg \text{shift3} \quad (2)$$

$$\theta(i, j) = \left(P^{(1)}(i, j) \gg \text{shift2}\right) - \left(P^{(0)}(i, j) \gg \text{shift2}\right) \quad (3)$$

After the sum $\psi_x(i,j)$ of horizontal direction gradients, the sum $\psi_y(i, j)$ of vertical direction gradients, the luma difference $\theta(i, j)$ of two reference blocks are obtained, a coefficient S1, a coefficient S2, a coefficient S3, a coefficient S5, and a coefficient S6 may be obtained in the following way. Of course, it is only one example and the obtaining way of each coefficient is not limited herein. In some examples, as shown in Formula (4), the coefficient S1 may be a sum of absolute values of the sums of horizontal direction gradients. For example, firstly, absolute values abs($\psi_x(i, j)$) of the sums $\psi_x(i,j)$ of horizontal direction gradients is determined and then summing is performed for the absolute values. As shown in Formula (5), the coefficient S2 may be a sum of products of "sum of horizontal direction gradients" and "sign bit of sum of vertical direction gradients", for example, firstly, the sign bit Sign [$\Psi_y(i, j)$] of sum of vertical direction gradients is determined, and then, a product of the sum $\psi_x(i, j)$ of horizontal direction gradients and the sign bit Sign [$\psi_y(i, j)$] is determined, and then, summing is performed for the products of both. As shown in Formula (6), the coefficient S3 may be a sum of products of "luma difference of two reference blocks" and "sign bit of sum of horizontal direction gradients", for example, firstly, the sign bit Sign [$\psi_x(i, j)$] of sum of horizontal direction gradients is determined, and then, a product of the luma difference $\theta(i, j)$ of two reference blocks and the sign bit Sign [$\psi_x(i, j)$] is determined, and then summing is performed for the products of both. As shown in Formula (7), the coefficient S5 may be a sum of absolute values of sums of vertical direction gradients, for example, firstly, the absolute value abs($\psi_y(i, j)$) of sum $\psi_y(i,j)$ of vertical direction gradients is determined, and then summing is performed for the absolute values. As shown in Formula (8), the coefficient S6 may be a sum of products of "the luma difference of two reference blocks" and "sign bit of sum of vertical direction gradients", for example, firstly, a sign bit Sign[$\psi_y(i, j)$] of sum of vertical direction gradients is determined, and then a product of the luma difference θ(i, j) of two reference blocks and the sign bit Sign[ψ$_y$(i, j)] is determined, and then summing is performed for the products of both.

$$S_1 = \Sigma_{(i,j) \in \Omega} abs(\psi_x(i,j)) \quad (4)$$

$$S_2 = \Sigma_{(i,j) \in \Omega} \psi_x(i,j) \cdot Sign[\psi_y(i,j)] \quad (5)$$

$$S_3 = \Sigma_{(i,j) \in \Omega} \theta(i,j) \cdot Sign[\psi_x(i,j)] \quad (6)$$

$$S_5 = \Sigma_{(i,j) \in \Omega} abs(\psi_y(i,j)) \quad (7)$$

$$S_6 = \Sigma_{(i,j) \in \Omega} \theta(i,j) \cdot Sign[\psi_y(i,j)] \quad (8)$$

In the formulas (4)-(8), Ω is a target reference block of 6*6 corresponding to the sub-block, i.e., the first target reference block and the second target reference block of the above examples, pixel values of the first target reference block are the first original prediction values of the sub-block, and pixel values of the second target reference block are the second original prediction values of the sub-block. i=xSb . . . xSb+5, j=ySb . . . ySb+5. Sign [x] represents a sign for x, where when x is less than 0, it is −1; when x is greater than 0, x is 1; and when x is equal to 0, x is 0. abs[x] represents an absolute value of x. ψ$_x$(i, j) represents a sum of horizontal direction gradients, ψ$_y$(i, j) represents a sum of vertical direction gradients, and θ(i, j) represents a luma difference of two reference blocks.

In the Formulas (1)-(3), shift2 may be a fixed value, for example, 4, and may also be an integer value relating to BD (bit depth), and shift3 may be a fixed value, for example, 1, and may also be an integer value relating to BD. Of course, it is merely an example, and the values of shift2 and shift 3 are not limited herein.

$$\frac{\partial P^{(0)}}{\partial x} \text{ and } \frac{\partial P^{(1)}}{\partial x}$$

represent horizontal direction gradients of the first target reference block and the second target reference block respectively, and $$\frac{\partial P^{(0)}}{\partial y} \text{ and } \frac{\partial P^{(1)}}{\partial y}$$

represent vertical direction gradients of the first target reference block and the second target reference block respectively.

$P^{(0)}$(i, j) represents a pixel value (e.g., luma value) of a pixel position (i, j) in the first target reference block, and $P^{(1)}$(i,j) represents a pixel value (e.g., luma value) of a pixel position (i, j) in the second target reference block. In some examples, the horizontal direction gradient may be determined based on the Formula (9), and the vertical direction gradient may be determined based on the Formula (10).

$$\frac{\partial P^{(k)}}{\partial x}(x, y) = \left(P^{(k)}(x+1, y) \gg shift1\right) - \left(P^{(k)}(x-1, y) \gg shift1\right) \quad (9)$$

$$\frac{\partial P^{(k)}}{\partial y}(x, y) = \left(P^{(k)}(x, y+1) \gg shift1\right) - \left(P^{(k)}(x, y-1) \gg shift1\right) \quad (10)$$

In the Formulas (9) and (10), shift1 may be a fixed value, for example, 6, and may also be an integer value relating to BD. Of course, it is only an example, and the value of the shift1 is not limited herein. $P^{(k)}$(x, y) represents a pixel value of a pixel position (x, y) in a target reference block, for example, $P^{(0)}$(x, y) represents a pixel value (e.g., luma value) of a pixel position(x, y) in the first target reference block, and $P^{(1)}$(x, y) represents a pixel value (e.g., luma value) of a pixel position(x, y) in the second target reference block.

In the above formulas, ≫ represents a rightward parallel movement, where a rightward parallel movement k is equivalent to division by $2^k$, and BD represents a bit depth, that is, a bit width required by the luma value, which is generally 8, 10, and 12. Of course, the 8, 10, and 12 are merely examples and thus the bit depth is not limited herein.

For the pixel value of the pixel position (x, y) in the target reference block, if a reference pixel is located at an edge of a sub-block, because there are no sufficient pixels around the pixel position to calculate a gradient, the gradients of these pixel positions are obtained by copying gradient of neighboring pixel positions. For example, when $$x = 0, \text{ or } x = dx + 1, \text{ or } y = 0, \text{ or } y = dy + 1,$$

$$\frac{\partial P^{(k)}}{\partial x}(x, y) = \frac{\partial P^{(k)}}{\partial x}(hx, hy), hx = Clip3(1, dx, x), hy = Clip3(1, dy, y).$$

A=Clip3(min, max□ x) represents that a value of A is limited to the range of [min, max], that is, if x is less than min, A=min, and if x is greater than max, A=max.

In a possible implementation, after the coefficient S1 and the coefficient S3 are obtained, the horizontal direction rate of the sub-block is determined according to the coefficient S1, the coefficient S3 and a rate threshold. For example, the horizontal direction rate v$_x$ may be determined in the following formula:

$$v_x = S_1 > 0 ? clip3(-th'_{BIO}, th'_{BIO}, -((4*S_3) \gg \lfloor \log_2 S_1 \rfloor)):0 \quad (11)$$

Of course, the Formula 11 is only an example, and thus not limited herein. In the Formula 11, th'$_{BIO}$ is a rate threshold, ⌊·⌋ represents rounding down, th'$_{BIO}$ may be a fixed integer, for example, 7, 15, 31, 63, 127 and the like, and preferably 15, and may also be an integer relating to BD, for example, $2^{13-BD}-1$. Of course, the above is only an example of th'$_{BIO}$ and will not be limited herein. th'$_{BIO}$ is used to limit the horizontal direction rate v$_x$ to between −th'$_{BIO}$ and th'$_{BIO}$, that is, the horizontal direction rate v$_x$ is greater than or equal to −th'$_{BIO}$, and the horizontal direction rate v$_x$ is less than or equal to th'$_{BIO}$. In the Formula 11, if S$_1$>0 is true, v$_x$=clip3(−th'$_{BIO}$, th'$_{BIO}$, −((4*S$_3$)≫⌊ log$_2$S$_1$⌋), and if S$_1$>0 is false, v$_x$=0. The meaning of Clip3 may be referred to the above embodiments.

After the coefficient S2, the coefficient S5 and the coefficient S6 are obtained, the vertical direction rate of the sub-block may be determined according to the coefficient S2, the coefficient S5, the coefficient S6, the rate threshold and the horizontal direction rate. For example, the vertical direction rate may be determined in the following formula:

$$v_y = S_5 > 0 ? clip3(-th'_{BIO}, th'_{BIO}, -((4*S_6-(v_x*S_2)/2) \gg \lfloor \log_2 S_5 \rfloor)):0 \quad (12)$$

Of course, the Formula 12 is only an example, and thus not limited herein. In the Formula 12, th'$_{BIO}$ is a rate threshold, ⌊·⌋ represents rounding down, th'$_{BIO}$ may be a fixed integer, for example, 7, 15, 31, 63, 127 and the like, and preferably 15, and may also be an integer relating to BD, for example, $2^{13-BD}-1$. th'$_{BIO}$ is used to limit the vertical direction rate v$_y$ to between −th'$_{BIO}$ and th'$_{BIO}$, that is, the vertical direction rate $v_y$ is greater than or equal to $-th'_{BIO}$, and the vertical direction rate $v_y$ is less than or equal to $th'_{BIO}$. In the Formula 12, if $S_5>0$ is true, $v_y=\text{clip3}(-th'_{BIO}, th'_{BIO}, -((4*S_6-(v_x*S_2)/2)>>\lfloor \log_2 S_5 \rfloor))$, and if $S_5>0$ is not false, $v_y=0$. The meaning of Clip3 may be referred to the above embodiments, and $v_x$ is the horizontal direction rate.

In another possible implementation, the vertical direction rate $v_y$ may also be determined in the following formula:

$$v_y = S_5>0?\text{clip3}(-th'_{BIO}, th'_{BIO}, -((4*S_6-((v_xS_{2,m})<<12+v_xS_{2,s})/2)>>\lfloor \log_2 S_5 \rfloor)):0 \quad (13)$$

In the formula 13, $S_{2,m}=S_2>>12$, $S_{2,s}=S_2\&(2^{12}-1)$, $<<$ represents a leftward parallel movement, where the leftward parallel movement k is equivalent to multiplication by $2^k$.

At step a6, prediction compensation offsets of the sub-block are obtained according to the horizontal direction rate and the vertical direction rate. For example, for each pixel position of the sub-block, prediction compensation offsets of the pixel position are obtained according to the horizontal direction rate and the vertical direction rate of the sub-block.

In a possible implementation, the first horizontal direction gradient and the first vertical direction gradient may be determined according to the first original prediction values, and the second horizontal direction gradient and the second vertical direction gradient may be determined according to the second original prediction values. Then, according to the horizontal direction rate, the first horizontal direction gradient, the second horizontal direction gradient, the vertical direction rate, the first vertical direction gradient and the second vertical direction gradient, the prediction compensation offset of each pixel position of the sub-block is obtained.

For example, the prediction compensation offset $b(x, y)$ of each pixel position of the sub-block may be obtained based on the following formula:

$$b(x, y) = v_x * \left( \frac{\partial P^{(0)}}{\partial x}(x+1, y+1) - \frac{\partial P^{(1)}}{\partial x}(x+1, y+1) \right) + v_y * \left( \frac{\partial P^{(0)}}{\partial y}(x+1, y+1) - \frac{\partial P^{(1)}}{\partial y}(x+1, y+1) \right) \quad (14)$$

Of course, the Formula 14 is only an example, and will not be limited herein. In the Formula 14, $$\frac{\partial P^{(0)}}{\partial x} \text{ and } \frac{\partial P^{(1)}}{\partial x}$$

represent the horizontal direction gradient of the first target reference block (i.e. the first horizontal direction gradient) and the horizontal direction gradient of the second target reference block (i.e. the second horizontal direction gradient) respectively, $$\frac{\partial P^{(0)}}{\partial y} \text{ and } \frac{\partial P^{(1)}}{\partial y}$$

represent the vertical direction gradient of the first target reference block (i.e. the first vertical direction gradient) and the vertical direction gradient of the second target reference block (i.e. the second vertical direction gradient) respectively. The first horizontal direction gradient and the second horizontal direction gradient may be determined in the Formula 9, and the first vertical direction gradient and the second vertical direction gradient may be determined in the Formula 10. The contents relating to the Formulas 9 and 10 may be referred to the above embodiments.

At step a7, target prediction values of the sub-block are obtained according to the first original prediction values, the second original prediction values and the prediction compensation offsets. For example, for each pixel position of the sub-block, the target prediction value of the pixel position may be obtained according to the first original prediction value, the second original prediction value and the prediction compensation offset of the pixel position, that is, each pixel position corresponds to one target prediction value.

For example, the target prediction value $\text{pred}_{BDOF}(x,y)$ of each pixel position of the sub-block may be obtained in the following formula, and the target prediction value $\text{pred}_{BDOF}(x,y)$ is a final prediction value of a luma value of each pixel position of the sub-block of 4*4:

$$\text{pred}_{BDOF}(x, y) =$$
$$\left( P^0[x+1][y+1] + P^1[x+1][y+1] + b(x, y) + \text{offset4} \right) \gg \text{shift4}$$
$$\text{pred}_{BDOF}(x, y) = \text{Clip3}\left(0, 2^{BD} - 1, \text{pred}_{BDOF}(x, y)\right)$$

In the above formulas, $P^{(0)}(x,y)$ represents a pixel value (luma value) of a pixel position (x, y) in the first target reference block, $P^{(1)}(x,y)$ represents a pixel value (luma value) of a pixel position (x, y) in the second target reference block. shift4 may be a fixed integer value, for example, 5, and may also be an integer value relating to BD, for example, Max(3, 15−BD), and the value of the shift4 is not limited herein. offset4=$2^{shift4-1}$. Of course, it is only an example of offset4 and the value of the offset4 is not limited.

At step a8, prediction values of the current block are determined according to the target prediction values of each sub-block.

Embodiment 7: the encoding and decoding method will be described in combination with specific application scenarios. The encoding and decoding method may include the following steps.

At step b1, whether to use a bidirectional prediction compensation mode for a current block is determined, and if yes, step b2 is performed.

In some examples, whether to use the bidirectional prediction compensation mode for the current block may be determined in the manner of Embodiment 1, or in the manner of Embodiment 5, or in the manner of Embodiment 4, which is not repeated herein.

At step b2, original prediction values $I^{(0)}(x, y)$ and $I^{(1)}(x, y)$ on a first reference picture and a second reference picture are obtained based on original motion information (two motion vectors, and reference picture indexes, i.e., the above first unidirectional motion information and second unidirectional motion information).

At step b3, for each sub-block of the current block, a horizontal direction (x direction) rate $v_x$ and a vertical direction (y direction) rate $v_y$ of a pixel on the first reference picture are obtained based on the original prediction values $I^{(0)}(x, y)$ and $I^{(1)}(x, y)$.

For example, autocorrelation and cross correlation coefficients S1, S2, S3, S5 and S6 of gradients are obtained based on the following formulas:

$$S_1 = \sum_{(i,j)\in\Omega} \psi_x(i,j)\cdot\psi_x(i,j)$$

$$S_2 = \sum_{(i,j)\in\Omega} \psi_x(i,j)\cdot\psi_y(i,j)$$

$$S_3 = \sum_{(i,j)\in\Omega} \theta(i,j)\cdot\psi_x(i,j)$$

$$S_5 = \sum_{(i,j)\in\Omega} \psi_y(i,j)\cdot\psi_y(i,j)$$

$$S_6 = \sum_{(i,j)\in\Omega} \theta(i,j)\cdot\psi_y(i,j)$$

In some examples, $\psi_x(i,j)$, $\psi_y(i,j)$ and $\theta(i,j)$ in the above formulas may be obtained in the following formulas.

$$\psi_x(i,j) = \left(\frac{\partial I^{(1)}}{\partial x}(i,j) + \frac{\partial I^{(0)}}{\partial x}(i,j)\right) \gg n_a$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

In the above formulas, $\Omega$ is a window of 6*6 around the sub-block of 4*4, and $n_a$ and $n_b$ are min(5, BD-7) and min(8, BD-4) respectively.

Next, based on S1, S2, S3, $S_5$ and $S_6$, a motion vector difference $(v_x, v_y)$ may be determined in the following formula:

$v_x = S_1 > 0 ? \text{clip3}(-\text{th}'_{BIO}, \text{th}'_{BIO}, -(S_3\cdot 2^{n_b n_a}) \gg \lfloor \log_2 S_1 \rfloor):0$ $v_y = S_5 > 0 ? \text{clip3}(-\text{th}'_{BIO}, \text{th}'_{BIO}, -((S_6\cdot 2^{n_b-n_a}-((v_x S_{2,m}) \gg n_{S_2+v_x} S_{2,s})/2) \ll \lfloor \log_2 S_5 \rfloor):0$ In the above formula, $$n_{S_2} = 12, S_{2,m} = S_2 \gg n_{S_2}, S_{2,s} = S_2 \& (2^{n_{S_2}}-1), \text{th}'_{BIO} = 2^{13-BD},$$

$\lfloor \cdot \rfloor$ represents rounding down, Clip3 (a, b, x) represents that, if x is less than a, x=a; if x is greater than b, x=b; otherwise, x is unchanged.

At step b4, for each pixel position of the sub-block, the prediction compensation offset of the pixel position is obtained according to the horizontal direction rate and the vertical direction rate of the sub-block, for example, the compensation signal b(x, y) may be obtained based on $(v_x, v_y)$ in the following formula:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + rnd\left(\left(v_y\left(\frac{\partial I^{(1)}(x,y)}{\partial y} - \frac{\partial I^{(0)}(x,y)}{\partial y}\right)\right)/2\right)$$

rnd is a rounding operation, and $$\frac{\partial I^{(k)}(x,y)}{\partial x} \text{ and } \frac{\partial I^{(k)}(x,y)}{\partial y}$$

represent gradients of horizontal direction and vertical direction respectively.

$$\frac{\partial I^{(k)}}{\partial x}(i,j) = \left(I^{(k)}(i+Lj) - I^{(k)}(i-1,j)\right) \gg \text{shift1}$$

$$\frac{\partial I^{(k)}}{\partial y}(i,j) = \left(I^{(k)}(i,j+1) - I^{(k)}(i,j-1)\right) \gg \text{shift1}$$

In some examples, >> represents a rightward parallel movement, $I^{(k)}(i,j)$ represents a pixel value of a reference picture of list k at the pixel position (i,j), and shift1=max(2, 14−BD), where BD represents a bit depth, i.e., a bit width required by a luma value, which is generally 10 or 8.

At step b5, a final prediction value $\text{pred}_{BDOF}(x,y)$ is obtained based on the compensation signal b(x, y) and the original prediction value.

$\text{pred}_{BDOF}(x,y) = (I^{(0)}(x,y) + I^{(1)}(x,y) + b(x,y) + o_{\text{offset}})$
  \>\>shift In some examples, shift=15−BD, $o_{\text{offset}} = 2^{\text{shift}-1} + 2^{14}$.

Embodiment 8: on the basis of Embodiments 1 to 7, for each sub-block unit of the current block, motion compensation based on a motion vector adjustment mode may also be performed for the sub-block unit. For example, a reference block 1 corresponding to the sub-block unit is determined according to the first original motion vector (the first unidirectional motion information of the above embodiments, including the first original motion vector and the first reference picture) of the sub-block unit; a reference block 2 corresponding to the sub-block unit is determined according to the second original motion vector (the second unidirectional motion information of the above embodiments, including the second original motion vector and the second reference picture) of the sub-block unit. By adjusting the first original motion vector and the second original motion vector according to pixel values of the reference block 1 and pixel values of the reference block 2, a first target motion vector corresponding to the first original motion vector and a second target motion vector corresponding to the second original motion vector are obtained.

Next, a reference block 3 corresponding to the sub-block unit is determined from the first reference picture based on the first target motion vector, and a reference block 4 corresponding to the sub-block unit is determined from the second reference picture based on the second target motion vector. In some examples, the process of obtaining the reference block 3 and the reference block 4 corresponding to the sub-block unit may be referred to the motion vector adjustment mode and will not be repeated herein.

With reference to the above embodiments, the reference block 3 is the first reference block corresponding to the sub-block unit, and the reference block 4 is the third reference block corresponding to the sub-block unit. After the first reference block and the third reference block corresponding to the sub-block unit are obtained, the bidirectional prediction compensation mode of the embodiments of the present disclosure may be adopted with its specific implementation process referred to Embodiments 1 to 7.

For example, after the first reference block and the third reference block are obtained through a motion compensation process based on the motion vector adjustment mode, the motion compensation based on the bidirectional prediction compensation mode may be performed based on the first reference block and the third reference block. For example, the second reference block corresponding to the sub-block unit is obtained by extending the first reference block, and the specific extension manner may be referred to the above embodiments. The fourth reference block corresponding to the sub-block unit is obtained by extending the third reference block, and the specific extension manner may be referred to the above embodiments.

Then, for each sub-block of one or more sub-blocks included in the sub-block unit, a first target reference block corresponding to the sub-block is selected from the second reference block corresponding to the sub-block unit, and first original prediction values of the sub-block are determined according to pixel values of the first target reference block. A second target reference block corresponding to the sub-block is selected from the fourth reference block corresponding to the sub-block unit, and second original prediction values of the sub-block are determined according to pixel values of the second target reference block. A horizontal direction rate and a vertical direction rate of the sub-block are determined according to the first original prediction values and the second original prediction values; prediction compensation offsets of the sub-block are obtained according to the horizontal direction rate and the vertical direction rate, and target prediction values of the sub-block are obtained according to the first original prediction values, the second original prediction values, and the prediction compensation offsets.

In a possible implementation, if a motion vector adjustment mode rather than a bidirectional prediction compensation mode is used for the current block, for each sub-block unit of the current block, the reference block 1 corresponding to the sub-block unit is determined according to the first original motion vector of the sub-block unit, and the reference block 2 corresponding to the sub-block unit is determined according to the second original motion vector of the sub-block unit. By adjusting the first original motion vector and the second original motion vector according to pixel values of the reference block 1 and pixel values of the reference block 2, the first target motion vector corresponding to the first original motion vector and the second target motion vector corresponding to the second original motion vector are obtained. Next, the reference block 3 corresponding to the sub-block unit is determined from the first reference picture based on the first target motion vector, and the reference block 4 corresponding to the sub-block unit is determined from the second reference picture based on the second target motion vector. By performing weighting on pixel values of the reference block 3 and pixel values of the reference block 4, the prediction values of the sub-block unit are obtained.

In another possible implementation, if the bidirectional prediction compensation mode rather than the motion vector adjustment mode is used for the current block, the implementation process may be referred to the Embodiments 1 to 7 and will not be repeated herein.

In another possible implementation, if the bidirectional prediction compensation mode and the motion vector adjustment mode are used for the current block, the bidirectional prediction compensation mode and the motion vector adjustment mode are used in the following manner.

For a sub-block unit with a size of dx*dy, if a minimum SAD value dmvrSad[xSbIdx][ySbIdxy] of the motion vector adjustment mode is smaller than a preset threshold (the preset threshold may be configured based on experiences and is not limited herein, for example, the preset threshold may be 2*dx*dy), the bidirectional prediction compensation process is not used for the sub-block unit but the reference block 3 corresponding to the sub-block unit is determined from the first reference picture based on the first target motion vector, and the reference block 4 corresponding to the sub-block unit is determined from the second reference picture based on the second target motion vector. By performing weighting on the pixel values of the reference block 3 and the pixel values of the reference block 4, the prediction value of each pixel position is obtained. For example, the final prediction value of each pixel position is pbSamples [x][y]=Clip3(0□$2^{BD}$−1□ ($P^0$[x+1][y+1]+$P^1$[x+1][y+1]+offset4)>>shift4).

For a sub-block unit with a size of dx*dy, if a minimum sum of absolute difference (SAD) value dmvrSad [xSbIdx][ySbIdxy] of the motion vector adjustment mode is not smaller than a preset threshold (the preset threshold may be configured based on experiences and is not limited herein, for example, the preset threshold may be 2*dx*dy), the bidirectional prediction compensation process is used for the sub-block unit, that is, motion vector adjustment process and the bidirectional prediction compensation process are performed for the sub-block unit. For example, the reference block 3 corresponding to the sub-block unit is determined from the first reference picture based on the first target motion vector, and the reference block 4 corresponding to the sub-block unit is determined from the second reference picture based on the second target motion vector. The second reference block corresponding to the sub-block unit is obtained by extending the reference block 3 (i.e., the first reference block of the above embodiments), and the fourth reference block corresponding to the sub-block unit is obtained by extending the reference block 4 (i.e., the third reference block of the above embodiments). Next, for each sub-block of one or more sub-blocks included in the sub-block unit, a first target reference block corresponding to the sub-block is selected from the second reference block corresponding to the sub-block unit, and first original prediction values of the sub-block are determined according to pixel values of the first target reference block. A second target reference block corresponding to the sub-block is selected from the fourth reference block corresponding to the sub-block unit, and second original prediction values of the sub-block are determined according to pixel values of the second target reference block. Then, a horizontal direction rate and a vertical direction rate are determined according to the first original prediction values and the second original prediction values; prediction compensation offsets are determined according to the horizontal direction rate and the vertical direction rate, and a prediction value of each pixel position is obtained according to the prediction compensation offset. For example, a final prediction value of each pixel position may be pbSamples [x] [y]=Clip3 (0, $2^{BD}$−1, ($P^0$[x+1] [y+1]+$P^1$[x+1] [y+1]+b (x,y)+offset4)>>shift4).

In the above embodiments, the minimum SAD value of the motion vector adjustment mode may be SAD of the reference block 3 and the reference block 4, for example, an SAD of downsampling between the pixel values of the reference block 3 and the pixel values of the reference block 4. When the SAD of the downsampling is determined, a parameter N of the downsampling may be configured based on experiences, for example, may be an integer greater than or equal to 0. If N is 0, no downsampling is performed.

In a possible implementation, the above embodiments may be implemented separately or by any combination, which is not limited herein. For example, the embodiment 4 and the embodiment 1 may be implemented by combination; the embodiment 4 and the embodiment 2 may be implemented by combination; the embodiment 4 and the embodiment 3 may be implemented by combination; the embodiment 4 and the embodiment 5 may be implemented by combination; the embodiment 4 and the embodiment 6 may be implemented by combination; the embodiment 4 and the embodiment 7 may be implemented by combination. The embodiment 2 and the embodiment 1 may be implemented by combination; the embodiment 2 and the embodiment 5 may be implemented by combination. The embodiment 3 and the embodiment 1 may be implemented by combination; the embodiment 3 and the embodiment 5 may be implemented by combination. The embodiment 1 may be implemented separately, the embodiment 2 may be implemented separately, the embodiment 3 may be implemented separately, the embodiment 5 may be implemented separately, the embodiment 6 may be implemented separately, and the embodiment 7 may be implemented separately. The embodiment 8 may be implemented in combination with any one of the embodiments 1 to 7. Of course, the above are only several examples of the present disclosure, which are not limited herein. All embodiments involved in the present disclosure may be implemented separately or by combination, and no redundant descriptions are made herein.

Figure 8:
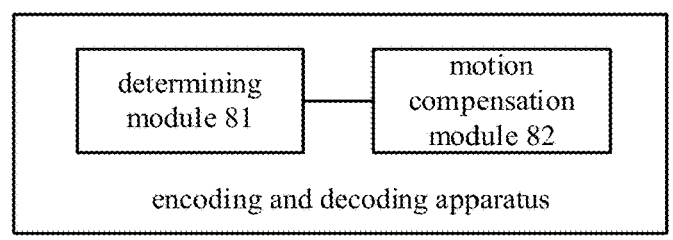
FIG. 8 is a structural diagram illustrating an encoding and decoding apparatus according to an embodiment of the present disclosure.

Based on the same application idea as the above method, one or more embodiments of the present disclosure further provide an encoding and decoding apparatus, which is applied to an encoder or a decoder. As shown in FIG. 8, a structural diagram of the apparatus is shown. The apparatus includes the following modules:

a determining module 81, configured to, if the following conditions are all satisfied, determine to use a bidirectional prediction compensation mode for a current block:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed earlier than and later than a current picture respectively, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation;

a motion compensation module 82, configured to: if determining to use the bidirectional prediction compensation mode for the current block, perform motion compensation based on the bidirectional prediction compensation mode for the current block.

The determining module 81 is further configured to: if one of the following conditions is not satisfied, determine not to use the bidirectional prediction compensation mode for the current block: control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed earlier than and later than a current picture respectively, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation.

The control information allows the current block to enable the bidirectional prediction compensation mode, including but not limited to that: sequence-level control information allows the current block to enable the bidirectional prediction compensation mode; and/or, picture-level control information allows the current block to enable the bidirectional prediction compensation mode.

The width, the height and the area of the current block are all within the defined ranges, which includes the following: the width is greater than or equal to a first threshold, the height is greater than or equal to a second threshold, and the area is greater than or equal to a third threshold; or, the width is greater than or equal to the first threshold, the height is greater than or equal to the second threshold, and the area is greater than or equal to a fourth threshold, where the third threshold is greater than the fourth threshold.

The first threshold is 8, the second threshold is 8, the third threshold is 128 and the fourth threshold is 64.

The motion compensation module 82 is specifically configured to: for each sub-block of one or more sub-blocks included in the current block:

determine first original prediction values and second original prediction values of the sub-block, and determine a horizontal direction rate and a vertical direction rate based on the first original prediction values and the second original prediction values;

according to the horizontal direction rate and the vertical direction rate, obtain prediction compensation offsets of the sub-block, and according to the first original prediction values, the second original prediction values and the prediction compensation offsets, obtain target prediction values of the sub-block;

determine the prediction values of the current block according to the target prediction values of each sub-block.

When determining the first original prediction values and the second original prediction values of the sub-block, the motion compensation module 82 is specifically configured to:

determine a sub-block unit corresponding to the sub-block, wherein the current block includes the sub-block unit and the sub-block unit includes the sub-block; determine a first reference block from a first reference picture according to first unidirectional motion information of the sub-block unit, and obtain a second reference block by extending the first reference block; select a first target reference block corresponding to the sub-block from the second reference block, and determine the first original prediction values of the sub-block according to pixel values of the first target reference block;

determine a third reference block from a second reference picture according to second unidirectional motion information of the sub-block unit, and obtain a fourth reference block by extending the third reference block; select a second target reference block corresponding to the sub-block from the fourth reference block, and determine the second original prediction values of the sub-block according to pixel values of the second target reference block.

when obtaining the second reference block by extending the first reference block, the motion compensation module 82 is specifically configured to: respectively fill N rows of integral pixels on an upper edge and a lower edge of the first reference block, and respectively fill N columns of integral pixels on a left edge and a right edge of the first reference block, so as to obtain the second reference block.

when obtaining the fourth reference block by extending the third reference block, the motion compensation module 82 is specifically configured to: respectively fill N rows of integral pixels on an upper edge and a lower edge of the third reference block, and respectively fill N columns of integral pixels on a left edge and a right edge of the third reference block, so as to obtain the fourth reference block.

In some examples, N is 0 or a positive integer.

Pixel values of the N rows of integral pixel filled in the second reference block and pixel values of the N columns of integral pixel filled in the second reference block are obtained by copying pixel values of neighboring integral pixel positions in the first reference picture, or by copying pixel values of neighboring pixel in the first reference block.

pixel values of the N rows of integral pixel filled in the fourth reference block and pixel values of the N columns of integral pixel filled in the fourth reference block are obtained by copying pixel values of neighboring integral pixel positions in the second reference picture, or by copying pixel values of neighboring pixel in the third reference block.

When obtaining the prediction compensation offsets of the sub-block according to the horizontal direction rate and the vertical direction rate, the motion compensation module 82 is specifically configured to: determine a first horizontal direction gradient and a first vertical direction gradient based on the first original prediction values; determine a second horizontal direction gradient and a second vertical direction gradient based on the second original prediction values; according to the horizontal direction rate, the first horizontal direction gradient, the second horizontal direction gradient, the vertical direction rate, the first vertical direction gradient, and the second vertical direction gradient, obtain the prediction compensation offsets of the sub-block.

Based on the same application idea as the above method, one or more embodiments of the present disclosure further provide an encoding and decoding apparatus, which is applied to an encoder or a decoder. The apparatus includes: a determining module, configured to, if the following conditions are all satisfied, determine to use a bidirectional prediction compensation mode for a current block: control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, the two reference pictures are displayed earlier than and later than a current picture respectively, the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; and a motion compensation module, configured to: if determining to use the bidirectional prediction compensation mode for the current block, perform motion compensation based on the bidirectional prediction compensation mode for the current block.

Figure 9A:
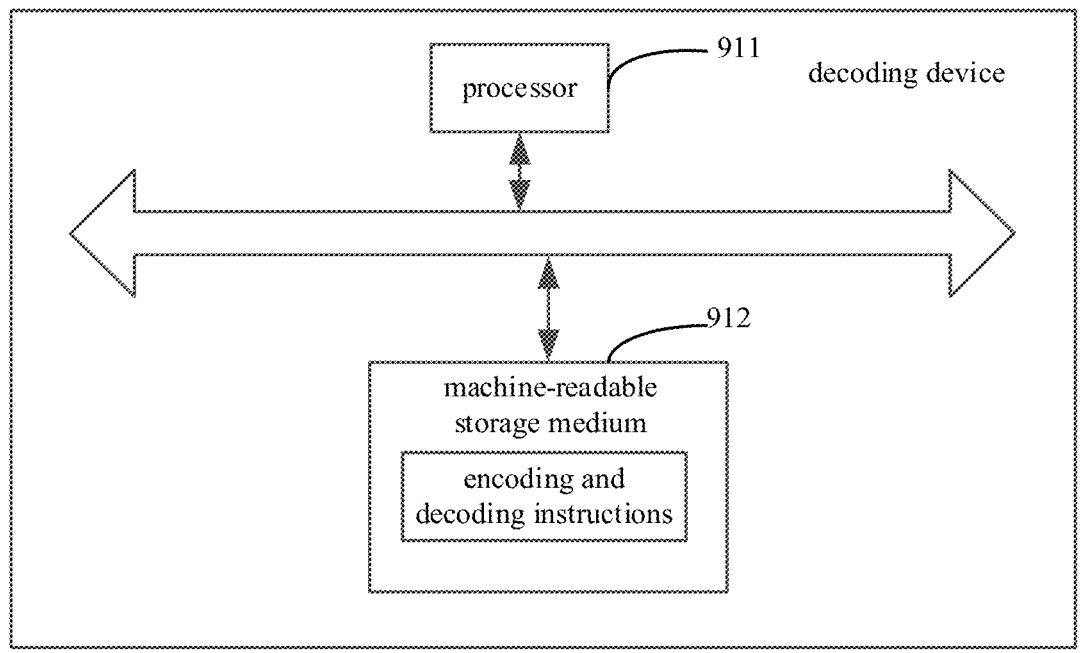
FIG. 9A is a hardware structure diagram illustrating a decoding device according to an embodiment of the present disclosure.

From hardware level, the hardware architecture schematic diagram of the decoder device provided by the embodiments of the present disclosure is shown in FIG. 9A. The device includes a processor 911 and a machine-readable storage medium 912, where the machine-readable storage medium 912 stores machine-executable instructions that can be executed by the processor 911; and the processor 911 is configured to execute the machine-executable instructions to implement the above-mentioned methods provided by the present disclosure. For example, the processor is configured to execute the machine executable instructions to implement the steps of:

if the following conditions are all satisfied, determining to use a bidirectional prediction compensation mode for a current block:

control information allows the current block to enable the bidirectional prediction compensation mode; the current block adopts a parallel movement motion model; a prediction mode of the current block is not a sub-block mode, not an SMVD mode and not a CIIP mode; prediction values of the current block is obtained by use of a weighted sample prediction process on reference blocks of two reference pictures, and the two reference pictures are displayed respectively earlier than and later than a current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation;

if determining to use the bidirectional prediction compensation mode for the current block, performing motion compensation based on the bidirectional prediction compensation mode for the current block.

Figure 9B:
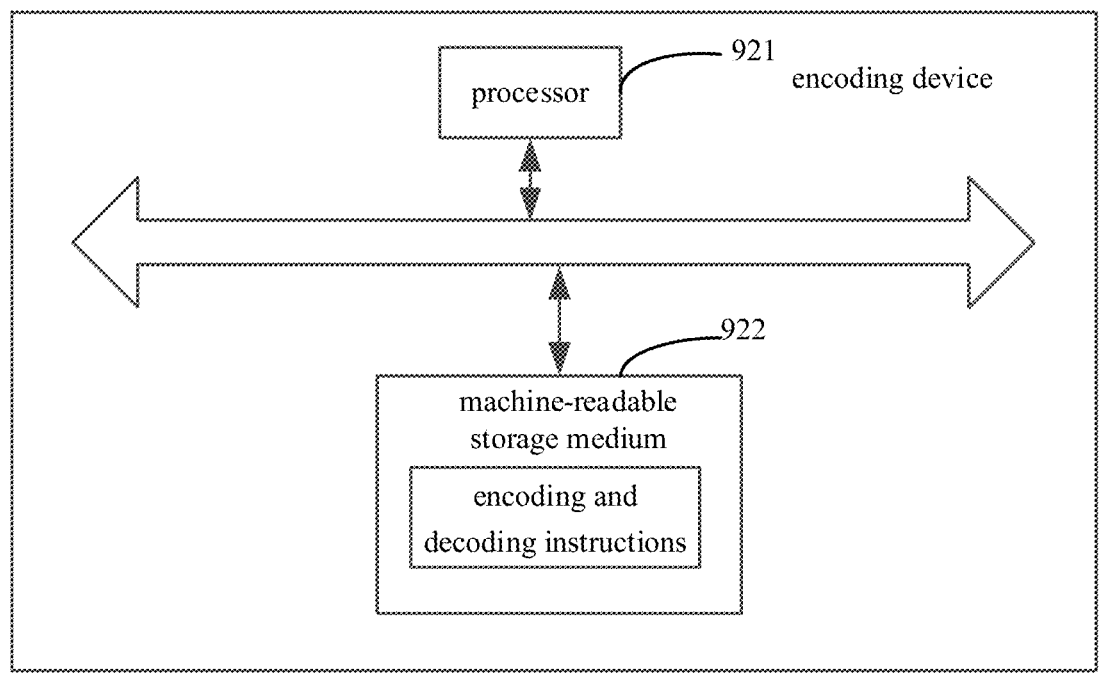
FIG. 9B is a hardware structure diagram illustrating an encoding device according to an embodiment of the present disclosure.

From hardware level, the hardware architecture schematic diagram of the encoder device provided by the embodiments of the present disclosure is shown in FIG. 9B. The device includes a processor 921 and a machine-readable storage medium 922, where the machine-readable storage medium 922 stores machine-executable instructions that can be executed by the processor 921; and the processor 921 is configured to execute the machine-executable instructions to implement the above-mentioned methods provided by the present disclosure. For example, the processor is configured to execute the machine executable instructions to implement the steps of:

if the following conditions are all satisfied, determining to use a bidirectional prediction compensation mode for a current block:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, and the two reference pictures are displayed respectively earlier than and later than a current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation;

if determining to use the bidirectional prediction compensation mode for the current block, performing motion compensation based on the bidirectional prediction compensation mode for the current block.

Based on the same application idea as the above method, one or more embodiments of the present disclosure further provide a camera, including: a processor and a machine-readable storage medium, where the machine-readable storage medium stores machine-executable instructions that can be executed by the processor; and the processor is configured to execute the machine-executable instructions to implement the above-mentioned methods provided by the present disclosure. For example, the processor is configured to execute the machine executable instructions to implement the steps of:

if the following conditions are all satisfied, determining to use a bidirectional prediction compensation mode for a current block:

control information allows the current block to enable the bidirectional prediction compensation mode; the current block adopts a parallel movement motion model; a prediction mode of the current block is not a sub-block mode, not an SMVD mode and not a CIIP mode; prediction values of the current block are obtained by use of a weighted sample prediction process on reference blocks of two reference pictures, and the two reference pictures are displayed respectively earlier than and later than a current picture, and the two reference pictures have a same distance from the current picture; the two reference pictures of the current block have a same weight; the two reference pictures of the current block both are short-term reference pictures; a width, a height and an area of the current block are all within defined ranges; the two reference pictures of the current block are identical in size to the current picture; the current block only performs luma component prediction compensation;

if determining to use the bidirectional prediction compensation mode for the current block, performing motion compensation based on the bidirectional prediction compensation mode for the current block.

Based on the same application idea as the above method, one or more embodiments of the present disclosure further provide a machine-readable storage medium, and the machine-readable storage medium stores several computer instructions. The computer instructions are executed by a processor to implement the encoding and decoding method of the embodiments of the present disclosure. Where, the machine-readable storage medium may be any electronic, magnetic, optical or other physical storage device, and may contain or store information such as executable instructions, and data, etc. For example, the machine-readable storage medium may be a Radom Access Memory (RAM), a volatile memory, a non-volatile memory, a flash memory, a memory driver (such as a hard disk drive), a solid disk drive, storage disks of any type (such as compact discs, DVDS, etc.), or similar storage mediums, or a combination thereof.

Based on the same application idea as the above method, one or more embodiments of the present disclosure further provide a computer program product. The computer program product includes computer instructions, and the computer instructions are executed by a processor to implement the encoding and decoding method of the embodiments of the present disclosure.

Based on the same application idea as the above method, one or more embodiments of the present disclosure further provide an encoding and decoding system. The encoding and decoding system includes a processor and a machine-readable storage medium, where the machine-readable storage medium stores machine-executable instructions that can be executed by the processor; and the machine-executable instructions are executed by the processor to implement the above-mentioned encoding and decoding method of the embodiments of the present disclosure.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, navigation equipment, an electronic mail transceiver, a tablet computer, wearable device, or combinations of any several devices of these devices.

For the convenience, the above-mentioned apparatus, when described, is divided into various units by function for descriptions. Of course, when the present disclosure is implemented, the functions of each unit can be implemented in one or more software and/or hardware.

Those skilled in the art should understand that the embodiments of the present disclosure may be provided as methods, systems, or computer program products. Therefore, the present disclosure may take the form of a pure hardware implementation, a pure software implementation, or an implementation combining software and hardware. Furthermore, the embodiments of the present disclosure may take the form of a computer program product implemented on one or more computer available storage mediums (including but not limited to disk memories, CD-ROM, optical memories, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processor, or other programmable data processing equipment to produce a machine, so that the instructions executed by the processor or other programmable data processing device generate a device for implementing functions specified in one or more flows in the flowchart and/or in one or more blocks in the block diagram. These computer program instructions may also be stored in a computer readable memory capable of directing a computer or other programmable data processing device to operate in a particular manner, so that the instructions stored in the computer readable memory generate a product including an instruction device, where the instruction device implements the functions specified in one or more flows in the flowchart and/or one or more blocks in the block diagram.

These computer program instructions can also be loaded onto a computer or other programmable data processing device, so that a series of operating steps may be performed on the computer or other programmable device to generate computer-implemented processing, and thus instructions executed on the computer or other programmable device provide steps for implementing the function specified in one or more flows in the flowchart and/or one or more blocks in the block diagram. The above descriptions are only some examples of the present disclosure, and are not used to limit the present disclosure. For those skilled in the art, the present disclosure may have various changes and modifications. Any modifications, equivalent replacements, improvements, etc. made in the spirit and principle of this present disclosure shall fall within the scope of claims of the present disclosure.

The invention claimed is:

1. A decoding method, comprising:
in response to determining to use bi-directional optical flow inter prediction mode for a current block, obtaining prediction values of the current block by performing motion compensation for the current block, which comprises:
for a sub-block unit with a size of dx*dy in the current block, in response to determining that a minimum sum of absolute difference (SAD) value of the sub-block unit is greater than or equal to a preset threshold 2*dx*dy when the current block uses motion vector adjustment mode and that the current block uses bi-directional optical flow inter prediction mode, obtaining prediction values of the sub-block unit by performing motion compensation for the sub-block unit; and
determining the prediction values of the current block according to prediction values of each sub-block unit in the current block;
wherein, obtaining the prediction values of the sub-block unit by performing motion compensation for the sub-block unit, comprises:
determining a fifth reference block corresponding to the sub-block unit according to a first original motion vector for the sub-block unit;
determining a sixth reference block corresponding to the sub-block unit according to a second original motion vector for the sub-block unit;
according to pixel values of the fifth reference block and pixel values of the sixth reference block, adjusting the first original motion vector and the second original motion vector to obtain a first target motion vector corresponding to the first original motion vector and a second motion vector corresponding to the second original motion vector;
determining, based on the first target motion vector, a first reference block corresponding to the sub-block unit from a first reference picture for the current block;
determining, based on the second target motion vector, a third reference block corresponding to the sub-block unit from a second reference picture for the current block;
for each sub-block of one or more sub-blocks included in the sub-block unit:
determining first original prediction values and second original prediction values of the sub-block based on the first reference block and the third reference block;
determining a horizontal direction rate and a vertical direction rate of the sub-block based on the first original prediction values and the second original prediction values;
obtaining prediction compensation offsets of the sub-block according to the horizontal direction rate and the vertical direction rate;
obtaining target prediction values of the sub-block according to the first original prediction values, the second original prediction values and the prediction compensation offsets;
determining prediction values of the sub-block unit according to the target prediction values of each sub-block of the sub-block unit.

2. The method according to claim 1, wherein, determining first original prediction values and second original prediction values of the sub-block based on the first reference block and the third reference block comprises:
obtaining a second reference block by extending the first reference block;
selecting a first target reference block corresponding to the sub-block from the second reference block;
determining the first original prediction values of the sub-block according to pixel values of the first target reference block;
obtaining a fourth reference block by extending the third reference block;
selecting a second target reference block corresponding to the sub-block from the fourth reference block; and
determining the second original prediction values of the sub-block according to pixel values of the second target reference block.

3. The method of claim 1, wherein, furthering comprising:
in response to determining that following conditions are satisfied, determining to use the bi-directional optical flow inter prediction mode for the current block;
wherein the conditions comprise:
picture-level control information allows the current block to enable the bi-directional optical flow inter prediction mode;
the current block doesn't use a combine inter intra prediction (CIIP) mode, a sub-block merge mode, or a symmetric motion vector difference (SMVD) mode;
the current block uses a parallel movement motion model;
the current block uses bidirectional prediction,
wherein, the prediction values of the current block are obtained by use of a weighted sample prediction process on reference blocks of two reference pictures for the bidirectional prediction, and the two reference pictures of the current block are same in weight; directions of the two reference pictures are different, one reference picture is displayed earlier than a current picture including the current block, the other reference picture is displayed later than the current picture, and the two reference pictures have a same distance from the current picture;
the two reference pictures both are short-term reference pictures;
the two reference pictures are identical in size to the current picture;
the size of the current block is satisfied: a width is greater than or equal to 8, a height is greater than or equal to 8, and an area is greater than or equal to 128;
the current block only performs prediction for luma component.

4. The method of claim 3, wherein,
two reference pictures of the current block being same in weight comprises:
picture-level weights of two reference pictures are same and block-level weights of two reference pictures are same;
picture-level weights of two reference pictures being same comprises: luma component weights of picture-level are same.

5. The method of claim 1, further comprising:
in response to that any one of following conditions is not satisfied, determining not to use the bi-directional optical flow inter prediction mode for the current block; wherein the conditions comprise:
picture-level control information allows the current block to enable the bidirectional prediction compensation mode;
the current block doesn't use a combine inter intra prediction (CIIP) mode, a sub-block merge mode, or a symmetric motion vector difference (SMVD) mode;
the current block uses a parallel movement motion model;
the current block uses bidirectional prediction,
wherein, the prediction values of the current block are obtained by use of weighted sample prediction process on reference blocks of two reference pictures for the bidirectional prediction, and the two reference pictures of the current block are same in weight; directions of the two reference pictures are different, one reference picture is displayed earlier than the current picture, the other reference picture is displayed later than the current picture, and the two reference pictures have a same distance from the current picture;
the two reference pictures of the current block both are short-term reference pictures;
the two reference pictures of the current block are identical in size to the current picture;
the size of the current block is satisfied: a width is greater than or equal to 8, a height is greater than or equal to 8, and an area is greater than or equal to 128;
the current block only performs prediction for luma component.

6. An encoding method, comprising:
in response to determining to use bi-directional optical flow inter prediction mode for a current block, obtaining prediction values of the current block by performing motion compensation for the current block, which comprises:
for a sub-block unit with a size of dx*dy in the current block, in response to determining that a minimum sum of absolute difference (SAD) value of the sub-block unit is greater than or equal to a preset threshold 2*dx*dy when the current block uses motion vector adjustment mode and that the current block uses bi-directional optical flow inter prediction mode, obtaining prediction values of the sub-block unit by performing motion compensation for the sub-block unit; and
determining the prediction values of the current block according to prediction values of each sub-block unit in the current block;
wherein, obtaining the prediction values of the sub-block unit by performing motion compensation for the sub-block unit, comprises:
determining a fifth reference block corresponding to the sub-block unit according to a first original motion vector for the sub-block unit;
determining a sixth reference block corresponding to the sub-block unit according to a second original motion vector for the sub-block unit;
according to pixel values of the fifth reference block and pixel values of the sixth reference block, adjusting the first original motion vector and the second original motion vector to obtain a first target motion vector corresponding to the first original motion vector and a second motion vector corresponding to the second original motion vector;
determining, based on the first target motion vector, a first reference block corresponding to the sub-block unit from a first reference picture for the current block;
determining, based on the second target motion vector, a third reference block corresponding to the sub-block unit from a second reference picture for the current block;
for each sub-block of one or more sub-blocks included in the sub-block unit:
determining first original prediction values and second original prediction values of the sub-block based on the first reference block and the third reference block;
determining a horizontal direction rate and a vertical direction rate of the sub-block based on the first original prediction values and the second original prediction values;
obtaining prediction compensation offsets of the sub-block according to the horizontal direction rate and the vertical direction rate;
obtaining target prediction values of the sub-block according to the first original prediction values, the second original prediction values and the prediction compensation offsets;
determining prediction values of the sub-block unit according to the target prediction values of each sub-block of the sub-block unit.

7. The method according to claim 6, wherein,
determining first original prediction values and second original prediction values of the sub-block based on the first reference block and the third reference block comprises:
obtaining a second reference block by extending the first reference block;
selecting a first target reference block corresponding to the sub-block from the second reference block;
determining the first original prediction values of the sub-block according to pixel values of the first target reference block;
obtaining a fourth reference block by extending the third reference block;
selecting a second target reference block corresponding to the sub-block from the fourth reference block; and
determining the second original prediction values of the sub-block according to pixel values of the second target reference block.

8. The method of claim 6, wherein, furthering comprising:
in response to determining that following conditions are satisfied, determining to use the bi-directional optical flow inter prediction mode for the current block; wherein the conditions comprise:
picture-level control information allows the current block to enable the bi-directional optical flow inter prediction mode;
the current block doesn't use a combine inter intra prediction (CIIP) mode, a sub-block merge mode, or a symmetric motion vector difference (SMVD) mode;
the current block uses a parallel movement motion model;
the current block uses bidirectional prediction,
wherein, the prediction values of the current block are obtained by use of a weighted sample prediction process on reference blocks of two reference pictures for the bidirectional prediction, and the two reference pictures of the current block are same in weight; directions of the two reference pictures are different, one reference picture is displayed earlier than a current picture including the current block, the other reference picture is displayed later than the current picture, and the two reference pictures have a same distance from the current picture;

the two reference pictures both are short-term reference pictures;

the two reference pictures are identical in size to the current picture;

the size of the current block is satisfied: a width is greater than or equal to 8, a height is greater than or equal to 8, and an area is greater than or equal to 128;

the current block only performs prediction for luma component.

9. The method of claim 8, wherein, two reference pictures of the current block being same in weight comprises:

picture-level weights of two reference pictures are same and block-level weights of two reference pictures are same;

picture-level weights of two reference pictures being same comprises: luma component weights of picture-level are same.

10. The method of claim 6, further comprising:

in response to that any one of following conditions is not satisfied, determining not to use the bi-directional optical flow inter prediction mode for the current block; wherein the conditions comprise:

picture-level control information allows the current block to enable the bidirectional prediction compensation mode;

the current block doesn't use a combine inter intra prediction (CIIP) mode, a sub-block merge mode, or a symmetric motion vector difference (SMVD) mode;

the current block uses a parallel movement motion model;

the current block uses bidirectional prediction, wherein, the prediction values of the current block are obtained by use of weighted sample prediction process on reference blocks of two reference pictures for the bidirectional prediction, and the two reference pictures of the current block are same in weight; directions of the two reference pictures are different, one reference picture is displayed earlier than the current picture, the other reference picture is displayed later than the current picture, and the two reference pictures have a same distance from the current picture;

the two reference pictures of the current block both are short-term reference pictures;

the two reference pictures of the current block are identical in size to the current picture;

the size of the current block is satisfied: a width is greater than or equal to 8, a height is greater than or equal to 8, and an area is greater than or equal to 128;

the current block only performs prediction for luma component.

11. A device, comprising a processor and a machine-readable storage medium, wherein the machine-readable storage medium stores machine-executable instructions executable by the processor; and the processor is configured to execute the machine-executable instructions to implement the operations comprising:

in response to determining to use bi-directional optical flow inter prediction mode for a current block, obtaining prediction values of the current block by performing motion compensation for the current block, which comprises:

for a sub-block unit with a size of dx*dy in the current block, in response to determining that a minimum sum of absolute difference (SAD) value of the sub-block unit is greater than or equal to a preset threshold 2*dx*dy when the current block uses motion vector adjustment mode and that the current block uses bi-directional optical flow inter prediction mode, obtaining prediction values of the sub-block unit by performing motion compensation for the sub-block unit; and determining the prediction values of the current block according to prediction values of each sub-block unit in the current block, wherein, obtaining the prediction values of the sub-block unit by performing motion compensation for the sub-block unit, comprises:

determining a fifth reference block corresponding to the sub-block unit according to a first original motion vector for the sub-block unit;

determining a sixth reference block corresponding to the sub-block unit according to a second original motion vector for the sub-block unit;

according to pixel values of the fifth reference block and pixel values of the sixth reference block, adjusting the first original motion vector and the second original motion vector to obtain a first target motion vector corresponding to the first original motion vector and a second motion vector corresponding to the second original motion vector;

determining, based on the first target motion vector, a first reference block corresponding to the sub-block unit from a first reference picture for the current block;

determining, based on the second target motion vector, a third reference block corresponding to the sub-block unit from a second reference picture for the current block;

for each sub-block of one or more sub-blocks included in the sub-block unit:

determining first original prediction values and second original prediction values of the sub-block based on the first reference block and the third reference block;

determining a horizontal direction rate and a vertical direction rate of the sub-block based on the first original prediction values and the second original prediction values:

obtaining prediction compensation offsets of the sub-block according to the horizontal direction rate and the vertical direction rate:

obtaining target prediction values of the sub-block according to the first original prediction values, the second original prediction values and the prediction compensation offsets;

determining prediction values of the sub-block unit according to the target prediction values of each sub-block of the sub-block unit.

12. The device according to claim 11, wherein, determining first original prediction values and second original prediction values of the sub-block based on the first reference block and the third reference block comprises:

obtaining a second reference block by extending the first reference block;
selecting a first target reference block corresponding to the sub-block from the second reference block;
determining the first original prediction values of the sub-block according to pixel values of the first target reference block;
obtaining a fourth reference block by extending the third reference block;
selecting a second target reference block corresponding to the sub-block from the fourth reference block; and
determining the second original prediction values of the sub-block according to pixel values of the second target reference block.

13. The device of claim 11, wherein, the operations furthering comprising:
in response to determining that following conditions are satisfied, determining to use the bi-directional optical flow inter prediction mode for the current block; wherein the conditions comprise:
picture-level control information allows the current block to enable the bi-directional optical flow inter prediction mode;
the current block doesn't use a combine inter intra prediction (CIIP) mode, a sub-block merge mode, or a symmetric motion vector difference (SMVD) mode;
the current block uses a parallel movement motion model;
the current block uses bidirectional prediction,
wherein, the prediction values of the current block are obtained by use of a weighted sample prediction process on reference blocks of two reference pictures for the bidirectional prediction, and the two reference pictures of the current block are same in weight; directions of the two reference pictures are different, one reference picture is displayed earlier than a current picture including the current block, the other reference picture is displayed later than the current picture, and the two reference pictures have a same distance from the current picture;
the two reference pictures both are short-term reference pictures;
the two reference pictures are identical in size to the current picture;
the size of the current block is satisfied: a width is greater than or equal to 8, a height is greater than or equal to 8, and an area is greater than or equal to 128;
the current block only performs prediction for luma component.

14. The device of claim 13, wherein,
two reference pictures of the current block being same in weight comprises:
picture-level weights of two reference pictures are same and block-level weights of two reference pictures are same;
picture-level weights of two reference pictures being same comprises: luma component weights of picture-level are same.

15. The device of claim 11, the operations further comprising:
in response to that any one of following conditions is not satisfied, determining not to use the bi-directional optical flow inter prediction mode for the current block; wherein the conditions comprise:
picture-level control information allows the current block to enable the bidirectional prediction compensation mode;
the current block doesn't use a combine inter intra prediction (CIIP) mode, a sub-block merge mode, or a symmetric motion vector difference (SMVD) mode;
the current block uses a parallel movement motion model;
the current block uses bidirectional prediction,
wherein, the prediction values of the current block are obtained by use of weighted sample prediction process on reference blocks of two reference pictures for the bidirectional prediction, and the two reference pictures of the current block are same in weight; directions of the two reference pictures are different, one reference picture is displayed earlier than the current picture, the other reference picture is displayed later than the current picture, and the two reference pictures have a same distance from the current picture;
the two reference pictures of the current block both are short-term reference pictures;
the two reference pictures of the current block are identical in size to the current picture;
the size of the current block is satisfied: a width is greater than or equal to 8, a height is greater than or equal to 8, and an area is greater than or equal to 128;
the current block only performs prediction for luma component.

16. A non-transitory computer readable storage medium storing computer programs, wherein the computer programs, when executed by a processor, cause the processor to implement operations according to the decoding method of claim 1.

17. A non-transitory computer readable storage medium storing computer programs, wherein the computer programs, when executed by a processor, cause the processor to implement operations according to the encoding method of claim 6.

* * * * *